(12) United States Patent  (10) Patent No.: US 7,832,084 B2
Dugas et al.  (45) Date of Patent: Nov. 16, 2010

(54) METHODS FOR RECORDING SERVO INFORMATION

(75) Inventors: Matthew P. Dugas, St. Paul, MN (US); Theodore A. Schwarz, St. Paul, MN (US); Gregory L. Wagner, Arden Hills, MN (US)

(73) Assignee: Advanced Research Corporation, White Bear Lake, MN (US)

( * ) Notice: Subject to any disclaimer, the term of this patent is extended or adjusted under 35 U.S.C. 154(b) by 706 days.

(21) Appl. No.: 11/510,902

(22) Filed: Aug. 28, 2006

(65) Prior Publication Data

US 2006/0288566 A1 Dec. 28, 2006

Related U.S. Application Data

(63) Continuation of application No. 10/840,857, filed on May 7, 2004, now Pat. No. 7,106,544.

(60) Provisional application No. 60/469,519, filed on May 9, 2003, provisional application No. 60/509,031, filed on Oct. 6, 2003, provisional application No. 60/469,517, filed on May 9, 2003.

(51) Int. Cl.
*G11B 5/127* (2006.01)
*H04R 31/00* (2006.01)

(52) U.S. Cl. ............... 29/603.07; 29/603.13; 29/603.14; 29/603.16; 29/603.18; 216/62; 216/65; 216/66; 360/121; 360/122; 360/317; 451/5; 451/41

(58) Field of Classification Search ............. 29/603.07, 29/603.13–603.16, 603.18; 360/77, 75, 121, 360/122, 317; 216/62, 65, 66; 451/5, 41
See application file for complete search history.

(56) References Cited

U.S. PATENT DOCUMENTS

| | | |
|---|---|---|
| 3,750,828 A | 8/1973 | Constable |
| 4,007,493 A | 2/1977 | Behr et al. |
| 4,314,290 A | 2/1982 | Ragle |
| 4,488,188 A | 12/1984 | Hansen et al. |
| 4,490,756 A | 12/1984 | Dost et al. |
| 4,539,615 A | 9/1985 | Arai et al. |
| 4,586,094 A | 4/1986 | Chambors et al. |
| 4,598,327 A | 7/1986 | Jen et al. |
| 4,642,709 A | 2/1987 | Vinal |
| 4,901,178 A | 2/1990 | Kobayashi et al. |
| 4,927,804 A * | 5/1990 | Zieren et al. ............. 505/171 |
| 5,079,663 A | 1/1992 | Ju et al. |
| 5,241,442 A | 8/1993 | Akashi |

(Continued)

*Primary Examiner*—Paul D Kim
(74) *Attorney, Agent, or Firm*—Dorsey & Whitney, LLP; Nathan J. Witzany, Esq.

(57) ABSTRACT

A method of recording servo information includes writing servo information in a data storage medium using a compound magnetic recording head. The compound magnetic recording head has a substrate including first and second magnetically permeable substrate portions and a substantially non-magnetic member interposed between the first and second magnetically permeable substrate portions. A magnetically permeable layer is provided over the first and second magnetically permeable substrate portions of the substrate and includes first and second writing gap features associated with the first and second substrate portions. The writing gap features are formed using a patterned mask layer over the magnetically permeable layer, wherein the patterned mask layer comprises first and second patterned gap features corresponding to the first and second writing gap features.

14 Claims, 23 Drawing Sheets

U.S. PATENT DOCUMENTS

| | | | |
|---|---|---|---|
| 5,280,402 A | 1/1994 | Anderson et al. | |
| 5,309,299 A | 5/1994 | Crossland et al. | |
| 5,319,502 A | 6/1994 | Feig | |
| 5,321,570 A | 6/1994 | Behr et al. | |
| 5,379,170 A | 1/1995 | Schwarz | |
| 5,432,652 A | 7/1995 | Comeaux et al. | |
| 5,434,732 A | 7/1995 | Schwarz et al. | |
| 5,488,525 A | 1/1996 | Adams et al. | |
| 5,572,392 A | 11/1996 | Aboaf et al. | |
| 5,621,188 A * | 4/1997 | Lee et al. | 174/390 |
| 5,652,015 A | 7/1997 | Aboaf et al. | |
| 5,689,384 A | 11/1997 | Albrecht et al. | |
| 5,890,278 A * | 4/1999 | Van Kesteren | 29/603.14 |
| 5,923,272 A | 7/1999 | Albrecht et al. | |
| 5,930,065 A | 7/1999 | Albrecht et al. | |
| 5,940,238 A | 8/1999 | Nayak et al. | |
| 5,966,264 A | 10/1999 | Belser et al. | |
| 5,982,711 A | 11/1999 | Knowles et al. | |
| 5,995,315 A | 11/1999 | Fasen | |
| 6,021,013 A | 2/2000 | Albrecht et al. | |
| 6,025,970 A | 2/2000 | Cheung | |
| 6,031,673 A | 2/2000 | Fasen et al. | |
| 6,034,835 A | 3/2000 | Serrano | |
| 6,236,538 B1 | 5/2001 | Yamada et al. | |
| 6,269,533 B2 | 8/2001 | Dugas | |
| 6,282,051 B1 | 8/2001 | Albrecht et al. | |
| 6,320,719 B1 | 11/2001 | Albrecht et al. | |
| 6,462,904 B1 | 10/2002 | Albrecht et al. | |
| 6,496,328 B1 | 12/2002 | Dugas | |
| 6,574,066 B1 | 6/2003 | Stubbs et al. | |
| 6,590,729 B1 | 7/2003 | Akagi et al. | |
| 6,678,116 B2 | 1/2004 | Dugas | |
| 6,721,126 B1 | 4/2004 | Bui et al. | |
| 6,754,026 B1 | 6/2004 | Koski | |
| 6,781,778 B1 | 8/2004 | Molstad et al. | |
| 6,795,246 B2 | 9/2004 | Yano et al. | |
| 6,798,608 B2 | 9/2004 | Chliwnyj et al. | |
| 6,831,805 B2 | 12/2004 | Chliwnyj et al. | |
| 6,873,487 B2 | 3/2005 | Molstad | |
| 6,879,457 B2 | 4/2005 | Eaton et al. | |
| 6,894,869 B2 | 5/2005 | Dugas | |
| 6,947,247 B2 | 9/2005 | Schwarz et al. | |
| 6,989,960 B2 | 1/2006 | Dugas | |
| 7,106,544 B2 | 9/2006 | Dugas et al. | |
| 2004/0109261 A1 | 6/2004 | Dugas | |
| 2005/0007323 A1 * | 1/2005 | Appelbaum et al. | 345/87 |
| 2005/0168869 A1 | 8/2005 | Dugas et al. | |
| 2005/0254170 A1 | 11/2005 | Dugas et al. | |

* cited by examiner

METHODS FOR RECORDING SERVO INFORMATION

PRIORITY CLAIM

The present Application is a continuation of U.S. Ser. No. 10/840,857, filed May 7, 2004, by Dugas et al., entitled SERVO SYSTEMS, SERVO HEADS, SERVO PATTERNS FOR DATA STORAGE ESPECIALLY FOR READING, WRITING, AND RECORDING IN MAGNETIC RECORDING TAPE, which claims priority from U.S. Provisional Patent Application having Ser. No. 60/469,519, filed on May 9, 2003, by Dugas et al. and titled SERVO FORMAT FOR AZIMUTH RECORDING; U.S. Provisional Patent Application having Ser. No. 60/509,031, filed on Oct. 6, 2003, by Dugas et al. and titled SERVO FORMAT FOR AZIMUTH RECORDING; and U.S. Provisional Patent Application having Ser. No. 60/469,517, filed on May 9, 2003, by Dugas et al. and titled SERVO BAND WITH ZIGZAG TRANSITIONS FOR AZIMUTH RECORDING IN LINEAR TAPE; wherein each of these provisional Applications is commonly owned by the assignee of the present application and wherein the entire contents of each is incorporated herein by reference.

FIELD OF THE INVENTION

The present invention relates generally to data storage reading, writing, and erasing systems, techniques, and devices incorporating servo capabilities and features. In particular, the present invention relates to systems incorporating azimuthal servo features and corresponding head configurations, especially for use in reading, writing, and erasing operations for achieving high recording densities.

BACKGROUND OF THE INVENTION

Various data recording, playback, and erasing techniques exist for recording data to and from data storage media, such as magnetic tape. Magnetic tapes are used for data storage in computer systems requiring data removability, low-cost data storage, high data-rate capability, and high volumetric efficiency and reusability. The rapidly accelerating growth in stored digital data and images, the Internet, and replacement of paper as long-term record retention, and the need for massive dense storage for reconnaissance and surveillance is creating a demand for corresponding increases in the data storage capacities of magnetic tape recording and reproducing systems, while maintaining the special requirements of high speed digital tape systems.

Tape recording and reproducing systems for use as computer data storage devices are often required to provide high data transfer rates and to perform a read check on all written data. To satisfy these requirements, conventional, orthogonal linear tape systems (where recorded transition lines that are created between regions of opposite magnetization are orthogonal to the head/tape motion direction) typically employ methods wherein the tracks of data lie parallel to each other and to the edge of the tape. Linear recording techniques offer high data transfer rates by employing reading and writing head configurations with multiple, parallel channels, wherein each read and write head pair provides a channel, typically with each writing or reading element in data transfer contact with the recording media a substantial portion of the time.

In orthogonal linear tape recording systems, data tracks generally are followed in the direction of tape movement with the read and write heads arranged in the same manner as the recorded transitions that are perpendicular to the direction of tape motion. The writer element to a significant degree defines the width of a data track (and thus the number of data tracks that can be provided across a tape of given width) by creating the regions or domains of magnetization following one another in the tape direction at the width of the write head.

The potential for misregistration of the read element to the written track (from tape wander, data track alignment or the like) requires in some systems that the read element be substantially smaller than the written track width in order to ensure that the read head is reading magnetization fields only within the desired data track. Thus, the read head element also (as is also limited by read head performance characteristics) limits how narrow the data track can be, and hence the maximum track density.

Not only is the data track width limited by the minimum read element size in order to meet the recording system's performance criterion, it also is limited to accommodate expected misregistration as may occur under the dynamic conditions of moving media and as may be determined empirically or by modeling. If a read head moves off the data track for whatever reason and begins to read a signal from the adjacent track, the possibility of erroneous data transfer increases. More specifically, the error rate is known to increase exponentially as the read head moves further off the data track. Typically, for an acceptable off-track error rate, the adjacent track signal must be less than ten percent of the data track signal being read.

The general premise is thus to write wide and read narrow. Writing wide, however, decreases the data density (less data tracks across a given tape width). Reading narrow is unfortunately limited by making an acceptable read element that will still meet signal amplitude, SNR (signal to noise ratio), and media defect sensitivity requirements. As a result, minimum track width is approximately the width of a read element that meets the above performance requirements plus twice the misregistration (normally the three sigma value since the misregistration is a statistical distribution).

There are a number of potential sources of read element to written track misregistration error, which error is systematic in that both the media and the drive are involved as potential sources of error. The principal sources of error include tape lateral motion, vibration in the head/actuator assembly, dimensional instability of the media substrate, and mechanical misalignments between read and write elements in manufacturing and assembly. Probably the most significant limitation on tape track densities is the tendency for the tape to experience lateral tape motion, which is a tendency for the tape to shift laterally relative to the linear direction of tape motion. During a data track write, lateral tape motion can cause one or more data tracks to deviate from a desired axis along which tracks are expected to be written. During reading, lateral tape motion can cause misregistration of the read head over the track being read. This build-up of potential misregistration of data tracks combined with other less significant potential sources of misregistration can result in a portion of the read element to be positioned over an adjacent data track, which, if significant enough, can cause an unacceptable level of data transfer errors. As noted above, the reading of an adjacent track is typically limited to ten percent or less of the desired data track signal. The normal method in linear tape recording to ameliorate the potential effects of this misregistration is to make the read element much narrower than, i.e., approximately half, the track width. However, as noted above, limitations of minimum signal amplitude, signal-to-noise-ratio, and sensitivity to media defects provides a lower limit as to how narrow the read element can actually be.

Thus, from a practical design perspective, an effective read head size as determined by such performance constraints would be doubled to determine a desirable data track width. As such, the effective read element size limits how narrow a data track can be made.

One developed method of increasing data track density involves azimuth recording techniques. Azimuth recording for data tracks has long been used in helical recording systems and has been more recently introduced into linear tape systems. Generally, in azimuth recording of either helical or linear tape systems, data transitions on alternate adjacent tracks are recorded at a similar but opposite azimuth angle (e.g., θ on one track and −θ on an adjacent track, with this alternating azimuth pattern repeating across the data band) and relative to an axis along which the head travels relative to the media. In helical tape recording systems, the head is moved relative to a linear tape movement at a significantly greater speed and at an angle to the relative direction of tape movement.

Azimuth recording itself is a well-understood technology that provides a level of suppression of an adjacent track signal. The suppression is based upon the well known relationship that the suppression, $S=20*\log 10[\sin x/x]$, where $x=(\pi W/\lambda)*\tan 2\theta$. In this relationship W is the data track width, θ is the positive value of the +/−θ angles that the recorded transitions make with the transverse axis to the head direction, and (is the wavelength associated with the minimum transition density (λ=two times the maximum transition spacing). Thus, a determined azimuth angle, θ, is dependent on factors such as the degree of suppression to be attained, the data track width W, and the minimum transition density or maximum λ of the readback signal spectra. In current systems the data track width W is at least an order of magnitude larger than λ and thus, a suitable transition angle θ can be relatively small to achieve sufficient suppression of an adjacent data track signal.

Because of such angular azimuth recording, a signal from a track adjacent to the data track being read can be sufficiently suppressed to an acceptable level, such as to be less than ten percent of the data track signal as noted above. Hence, a read element can overextend an adjacent track and thus can be designed to be wider than the data track, allowing the full data track signal to be utilized. Azimuth style recording for data tracks is further described in U.S. Pat. No. 6,947,247, the entirety of which is incorporated herein by reference; as well as in U.S. Pat. No. 4,539,615.

Some current linear serpentine tape drives for azimuth recording typically utilize a single head structure that contains two pairs of read and write elements. Like orthogonal head structures, azimuthal head structures are typically designed with the read and write elements parallel to each other and aligned in the direction of tape movement when brought into the proper alignment with the desired azimuth angle. Thus, by offsetting the read and write elements as they are positioned along lines that are parallel to one another as to the distance along the parallel lines, an orthogonally constructed head can be positioned to record and read azimuthal tracks when rotated at an appropriate angle. The read and write elements can be aligned so that with the proper spatial relationship between them, they are able to read and write adjacent tracks and only require transversal repositioning once for every track pair. Such transversal movement and positioning or tracking can be conventionally controlled by known actuators. Tracking can be achieved in a single head, but usually requires the additional complexity and weight of a dual degree freedom actuator, such as conventionally known and that permits both rotary movement of the single head and movement of the head in the transverse direction to the tape movement. A compound dual degree freedom of motion actuator, i.e. a single unit to provide multiple types of motion, adds additional mass and generally needs to carry twice as many leads in order to accommodate forward and reverse read and write capabilities. This provision of additional leads adds stiffness to the system that can inhibit or interfere with its motion capabilities.

Recent generations of multi-channel linear serpentine tape systems have used servo tracking to decrease track misregistration. The use of servo tracking has greatly reduced tracking errors due to manufacturing alignment and offset tolerances between the read and write element arrays, skew errors, some track shift due to tape substrate dimensional instability, and the effect of lateral tape motion. In such systems, position sensing read sensors (servo elements) detect prewritten servo tracks on the tape that can be laid down under tightly controlled conditions to reduce misalignment of the servo tracks to the tape. The tape is typically divided into alternating bands of data tracks and servo tracks where the band of data tracks can be much wider than the servo band; typically the data band is 8 to 16 times the width of the servo band, depending on the number of data channels. From the output signals of the servo data elements, a position error signal can be determined that is used by the servo control loop to dynamically and more accurately position the data elements over their tracks. Typically, the servo elements are located in the same array as the read elements and can be symmetrically placed outboard of the read array on each side.

Notwithstanding the widespread use of servo systems and formats, in helical recording the Position Error Signal (PES) generally has been embedded in the data-recording band and uses the data read head as the servo transducer. Also, when recording or writing, the head moves in only one direction relative to the tape and the tape is only moving in one direction. Quantum Corp., for example, has used azimuthal recording in its DLT drives, but does not track follow.

A number of different encoding schemes have been proposed for servo formats. The four most prevalent forms of encoding are frequency encoding, amplitude encoding, time-base encoding, and phase encoding. All tend to share a common characteristic where the servo transducer is a single element. Further, except for time-based encoding, the primary characteristic of these approaches is that the encoded servo features on alternate servo tracks are different. In some cases this differentiation can be extended to more tracks to provide either a larger capture range when accessing the track or enhancing track identification.

Most current servo systems used commercially in linear serpentine tape systems commonly employ either an amplitude modulated mono-frequency signal (AM system) or a "Time Base" system. A typical AM system might utilize a single servo read element to detect the position error signal where the "on track" PES is half, or less, than the data signal. The weaknesses of the AM approach include the susceptibility of the PES to dropouts and noise, the reduced sample rate, the wider band width to accommodate the modulation, and without writing (erasing the holes) the tracks individually, the inability to identify the selected track.

Time-based servo position error signals have been introduced by IBM in some of its latest products and the philosophy has been extended to the LTO family drives that are being produced by IBM, Seagate, and HP. Time-based servos use slightly (typically 6-7 degrees) but, oppositely angled transitions for the servo timing features, e.g., "diamond-shaped," "vee," "inverted vee" features, combinations of these, or the like. The time difference among servo transitions as a function of transverse position of the servo head on tape provides the positioning information. The servo transducer orientation is nominally perpendicular to the track direction so that the transitions are encountered at a slight angle.

Hybrid thin film/ferrite servowriter heads with precision patterns have been developed to record the time-based servo tracks for IBM and LTO tape heads. See, e.g., U.S. Pat. No. 6,795,246, incorporated herein by reference in its entirety. See, also, U.S. Pat. Nos. 6,496,328; 6,269,533; 6,678,116; 6,894,869; and 6,989,960, all of which are incorporated by reference herein in their entireties.

A typical Time Base system might use a servo read element much narrower than the track width or data read elements, hence a much lower signal level and signal-to-noise ratio (SNR), while trying to achieve a high spatial resolution. Neither system typically provides positive track identification, although the Time Based system could allow servo group identification.

A significant advantage of the "Time Based" Servo approach is that it is relatively insensitive to dropouts and Gaussian noise. However, because of the narrowness of the servo transducer, the signal to noise ratio (SNR) is quite low. Perturbation along the axis of the tape in the transitions is magnified in the transverse direction by 1/sin(, where (is the azimuth angle of the transitions. Thus, with an azimuth angle of about 6 degrees to 7 degrees, perturbation is magnified by a factor of about ten. Further, although the measurement is insensitive to any static variation in the tape speed, significant error may tend to be introduced by any dynamic variation in the tape speed. Like the AM system, this approach typically does not provide for unique identification of the data track. Further, modeling and simulation have shown that the current time-based approaches may be limited to intrinsic (to the servo pattern and head only) misregistrations of several tenths of micron, thus limiting maximum track density to 4,000-6,000 tracks per inch.

With the trend toward recording higher densities, the industry strongly needs a servo format and system that allows increasingly more accurate on track guidance. It would be further desirable to have a servo format and system that allows positive track and group identification at the beginning, end, and optionally periodically along the length of a tape.

SUMMARY OF THE INVENTION

The present invention provides improved methods and systems for data recording and reading for increasing overall tape data storage density, especially for data written in azimuth style. The principles of the invention provide servo formats and systems that allow accurate on track guidance for higher density applications and that are less sensitive to off track error. Preferred embodiments of the invention offer servo formats and systems of the invention that allows positive track and group identification at the beginning, end, and optionally periodically along the length of a tape.

The present invention offers one or more strategies that may be used singly or in combination to achieve one or more of such goals. Firstly, the present invention provides azimuthal servo formatting in which one or more servo bands contain multiple servo tracks where the transitions on adjacent servo tracks are written at opposing, azimuthal angles (i.e., positive and negative azimuth angles) relative to a perpendicular to the tape path. The correspondingly active servo and data transducers preferably are co-linear with each other when parallel to the azimuthal transitions. The servo band is desirably positioned functionally proximate to at least one corresponding data group to assist tracking during data record, write, and/or erase operations. The data group preferably includes data tracks grouped functionally into one or more data bands, wherein the data tracks also are preferably written in azimuth style.

Further, servo systems of the invention optionally use centertapped servo read heads. In one representative embodiment a single centertapped head with at least two servo sensors is used for on track guidance in at least one associated data group. In another representative embodiment, two non-centertapped or centertapped heads may be utilized in a pair of servo bands sandwiching an associated data group. The centertapped heads may be centered over the servo track of interest. The centertapped heads may be offset or large enough so as to straddle a servo track boundary inasmuch as the signal on adjacent servo tracks is suppressed due to the azimuth character of the servo tracks.

Third, and counter-intuitively, the servo track pitch, centertap width, and/or centertap sensor widths may be increased relative to conventional practice to improve data density. For instance, the centertap width may be arbitrarily wide so as to allow the two sensors of a centertapped servo head to detect signals from two nonadjacent servo tracks. With this approach, the data tracks can have a pitch that is a fraction of the servo track pitch, helping to facilitate high density data recording, playback, and erasing. Additionally, a higher quality servo signal is obtained by using relatively large servo track pitches and servo sensors. This aspect of the invention is particularly preferred in data storage systems whose media incorporate servo tracks written at the same or different azimuth angles.

The present invention further provides in some embodiments a servo system incorporating two or more classes (e.g., amplitude, frequency, time-base, phase, etc.) of servo encoding schemes incorporated into a servo band of a data storage medium. In preferred embodiments, azimuthal servo transitions provide an amplitude based scheme for servo guidance, and time-based transitions help to provide positive track and or group identification. The combination of AM and time-based encoding schemes not only offers known advantages of each while eliminating many drawbacks, but also offers unique advantages not achieved by either scheme alone.

Furthermore, servowriter heads are described that are capable of recording such servo patterns on a data storage medium.

In one aspect, the present invention relates to a servo writing head that generates a magnetic flux for producing one or more servo patterns in a data storage medium. The head comprises a zigzag servo writing gap, wherein the zigzag servo writing gap comprises at least three legs of a zigzag pattern. The aspect further relates to a method of using this servo head write an azimuthal style servo pattern into at least a portion of at least one servo band on the data storage medium.

In another aspect, the present invention relates to a method of writing servo features on a data storage medium, comprising the steps of:
(a) providing a servo writing head that comprises at least one zigzag servo writing gap, wherein the zigzag servo writing gap comprises at least three legs of a zigzag pattern; and
(b) using the head to create corresponding zigzag servo transitions constituting at least a portion of a servo band of the data storage medium.

In another aspect, the present invention relates to a data storage medium comprising at least one servo band and at least one data band, wherein the servo band comprises a plurality of servo tracks, each of said servo tracks comprising azimuthal servo transitions having an azimuthal orientation that alternates from servo track to adjacent servo track.

In another aspect, the present invention relates to a method of recording data on a data storage medium, comprising the steps of:
 (a) providing a data storage medium comprising at least one servo band having a plurality of servo tracks, each of said servo tracks comprising azimuthal servo transitions having an azimuthal orientation that alternates from servo track to adjacent servo track; and
 (b) recording data onto one or more data tracks of the data storage medium in a manner such that the data tracks comprise azimuthal data transitions having an azimuthal orientation that alternates from servo track to adjacent servo track.

In another aspect, the invention relates to a method of reading data on a data storage medium, comprising the steps of:
 (a) providing a data storage medium comprising (i) at least one servo band and at least one data band, wherein the servo band comprises a plurality of servo tracks, each of said servo tracks comprising azimuthal servo transitions having an azimuthal orientation that alternates from servo track to adjacent servo track, and (ii) at least one data band comprising a plurality of data tracks;
 (b) deriving a servo signal from the servo band; and
 (c) using information comprising the servo signal to assist in reading data from at least one of the data tracks.

In another aspect, the present invention relates to a tape cartridge that includes a cartridge housing; and a data storage medium contained in the cartridge housing, wherein the data storage medium comprises at least one servo band and at least one data band, wherein the servo band comprises a plurality of servo tracks, each of said servo tracks comprising azimuthal servo transitions having an azimuthal orientation that alternates from servo track to adjacent servo track.

In another aspect, the present invention relates to a servo pattern writing apparatus, comprising a servo writing head that generates a magnetic flux for producing one or more servo patterns in a data storage medium, the head comprising a zigzag servo writing gap, wherein the zigzag servo writing gap comprises at least three legs of a zigzag pattern.

In another aspect, the present invention relates to a servo writer head, comprising:
 (a) a substrate, comprising:
  (i) first and second sub-pole members; and
  (ii) a sub-gap member interposed between the first and second sub-pole members;
 (b) a magnetically permeable layer formed over the substrate such that said magnetically permeable layer overlies the first and second sub-pole members and the sub-gap member;
 (c) at least a first servo writing gap pattern formed in a portion of the magnetically permeable layer overlying the sub-gap member; and
 (d) a thin film coil energizingly coupled to the substrate in a manner such that a magnetic flux pattern corresponding to the servo writing gap pattern can be written in a data storage medium.

This aspect of the present invention also relates to a method of using this head to write servo information in a data storage medium.

In another aspect, the present invention relates to a compound servo writer head, comprising:
 (a) a first servo writing portion comprising:
  (i) a substrate, comprising:
   (1) first and second sub-pole members; and
   (2) a sub-gap member interposed between the first and second sub-pole members;
  (ii) a magnetically permeable layer formed over the substrate such that said magnetically permeable layer overlies the first and second sub-pole members and the sub-gap member;
  (iii) at least a first servo writing gap pattern formed in a portion of the magnetically permeable layer overlying the sub-gap member; and
  (iv) a thin film coil energizingly coupled to the substrate in a manner such that a magnetic flux pattern corresponding to the servo writing gap pattern can be written in a data storage medium.
 (b) a second servo writing portion comprising:
  (i) a substrate, comprising:
   (1) first and second sub-pole members; and
   (2) a sub-gap member interposed between the first and second sub-pole members;
  (ii) a magnetically permeable layer formed over the substrate such that said magnetically permeable layer overlies the first and second sub-pole members and the sub-gap member;
  (iii) at least a second servo writing gap pattern formed in a portion of the magnetically permeable layer overlying the sub-gap member; and
  (iv) a coil energizingly coupled to the substrate in a manner such that a magnetic flux pattern corresponding to the servo writing gap pattern can be written in a data storage medium.

This aspect of the invention also relates to a method of recording servo information, comprising the step of using the servo writer head of claim 64 to write servo information in a data storage medium.

In another aspect, the present invention relates to a compound servo writer head, comprising:
 (a) a first servo writing portion comprising:
  (i) a substrate, comprising:
   (1) first and second sub-pole members; and
   (2) a sub-gap member interposed between the first and second sub-pole members;
  (ii) a magnetically permeable layer formed over the substrate such that said magnetically permeable layer overlies the first and second sub-pole members and the sub-gap member;
  (iii) at least a first servo writing gap pattern formed in a portion of the magnetically permeable layer overlying the sub-gap member; and
  (iv) a coil energizingly coupled to the substrate in a manner such that a magnetic flux pattern corresponding to the servo writing gap pattern can be written in a data storage medium; and
 (b) a second servo writing portion comprising:
  (i) a substrate, comprising:
   (1) first and second sub-pole members; and
   (2) a sub-gap member interposed between the first and second sub-pole members;
  (ii) a magnetically permeable layer formed over the substrate such that said magnetically permeable layer overlies the first and second sub-pole members and the sub-gap member;

(iii) at least a second servo writing gap pattern formed in a portion of the magnetically permeable layer overlying the sub-gap member; and (iv) a coil energizingly coupled to the substrate in a manner such that a magnetic flux pattern corresponding to the servo writing gap pattern can be written in a data storage medium.

This aspect of the invention also relates to a method of recording servo information, comprising the step of using the servo writer head of claim 80 to write servo information in a data storage medium.

In another aspect, the present invention relates to a method of making a compound servo writing head, comprising the steps of:

(a) providing a substrate comprising first and second magnetically permeable substrate portions;

(b) forming a magnetically permeable layer over the first and second magnetically permeable substrate portions of the substrate, wherein the magnetically permeable layer comprises first and second writing gap features associated with the first and second substrate portions, respectively.

In another aspect, the present invention relates to a data storage medium, comprising servo information, said servo information including first and second kinds of encoded servo features.

In another aspect, the present invention relates to a data storage cartridge, comprising:

(a) a housing; and (b) a data storage medium contained in the housing, said medium comprising servo information that includes first and second kinds of encoded servo features.

In another aspect, the present invention relates to a data storage system comprising:

(a) a data storage medium comprising servo information that includes first and second kinds of encoded servo features and data information;

(b) at least one servo sensor operationally that engages the data storage medium in a manner effective to read the servo information; and (c) at least one data sensor operationally that engages the data storage medium in a manner effective to read the data information.

Another aspect of the present invention relates to a method of writing servo information onto a data storage medium, comprising the steps of writing a first kind of servo information onto the data storage medium that provides track following information and writing a second kind of servo information onto the data storage medium that provides identification information.

Another aspect of the present invention relates to a data storage medium, comprising (a) a plurality of servo tracks; and (b) a plurality of data tracks; and (c) wherein the data tracks have a track pitch $T_d$ and the servo tracks have a track pitch $T_s$, wherein $T_s = mT_d$, wherein m is greater than 1.

In another aspect, the present invention relates to a data storage system, comprising:

(a) a data storage medium, comprising (i) a plurality of azimuth style servo tracks having a track pitch $T_s$; and (ii) a plurality of azimuth style data tracks having a track pitch $T_d$ wherein $T_s = mT_d$, wherein m is greater than 1;

(c) a first servo sensor that readingly engages the plurality of servo tracks; and (d) a first data sensor that readingly engages the plurality of data tracks.

Another aspect of the present invention relates to a method of making a compound servo writer head, comprising the steps of:

(a) providing a first servo writer head portion, comprising:

(i) first and second sub-pole members; and (ii) a first sub-gap member interposed between the first and second sub-pole members;

(iii) a first magnetically permeable layer formed over the first and second sub-pole members and the first sub-gap member;

(iv) at least a first servo writing gap pattern formed in a portion of the magnetically permeable layer overlying the first sub-gap member; and (v) a first coil energizingly coupled to the substrate in a manner such that a magnetic flux pattern corresponding to the first servo writing gap pattern can be written in a data storage medium;

(b) providing a second servo writer head portion, comprising:

(i) third and fourth sub-pole members; and (ii) a second sub-gap member interposed between the third and fourth sub-pole members;

(iii) a second magnetically permeable layer formed over the third and fourth sub-pole members and the second sub-gap member;

(iv) at least a second servo writing gap pattern formed in a portion of the magnetically permeable layer overlying the second sub-gap member; and (v) a second coil energizingly coupled to the substrate in a manner such that a magnetic flux pattern corresponding to the second servo writing gap pattern can be written in a data storage medium; and (c) mechanically assembling the first and second servo writer head portions to form the compound head in a manner such that the first and second servo writing gap patterns are in a predetermined spatial relationship with respect to each other on a data storage media engaging surface of the compound servo writer head. This aspect of the invention also relates to a method of recording servo information, comprising the step of using the servo writer head to write servo information in a data storage medium.

BRIEF DESCRIPTION OF THE DRAWINGS

The understanding of the above mentioned and other advantages of the present invention, and the manner of attaining them, and the invention itself can be facilitated by reference to the following description of the exemplary embodiments of the invention taken in conjunction with the accompanying drawings, wherein.

DETAILED DESCRIPTION

The embodiments of the present invention described below are not intended to be exhaustive or to limit the invention to the precise forms disclosed in the following detailed description. Rather a purpose of the embodiments chosen and described is so that the appreciation and understanding by others skilled in the art of the principles and practices of the present invention can be facilitated.

Figure 1:
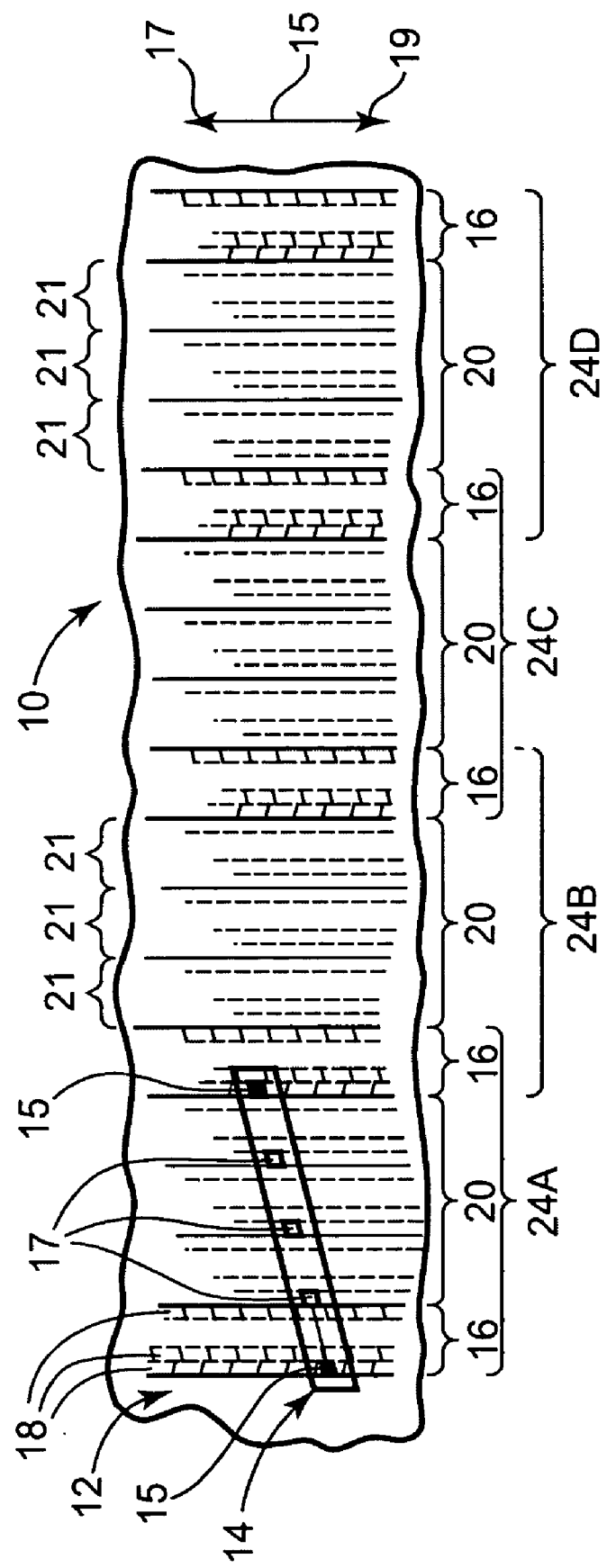
FIG. 1 is a schematic plan view of a portion of a data storage system showing a thin film head engaging a magnetic recording tape of the present invention, wherein the tape comprises a plurality of servo and data features written in azimuth style.
Figure 2:
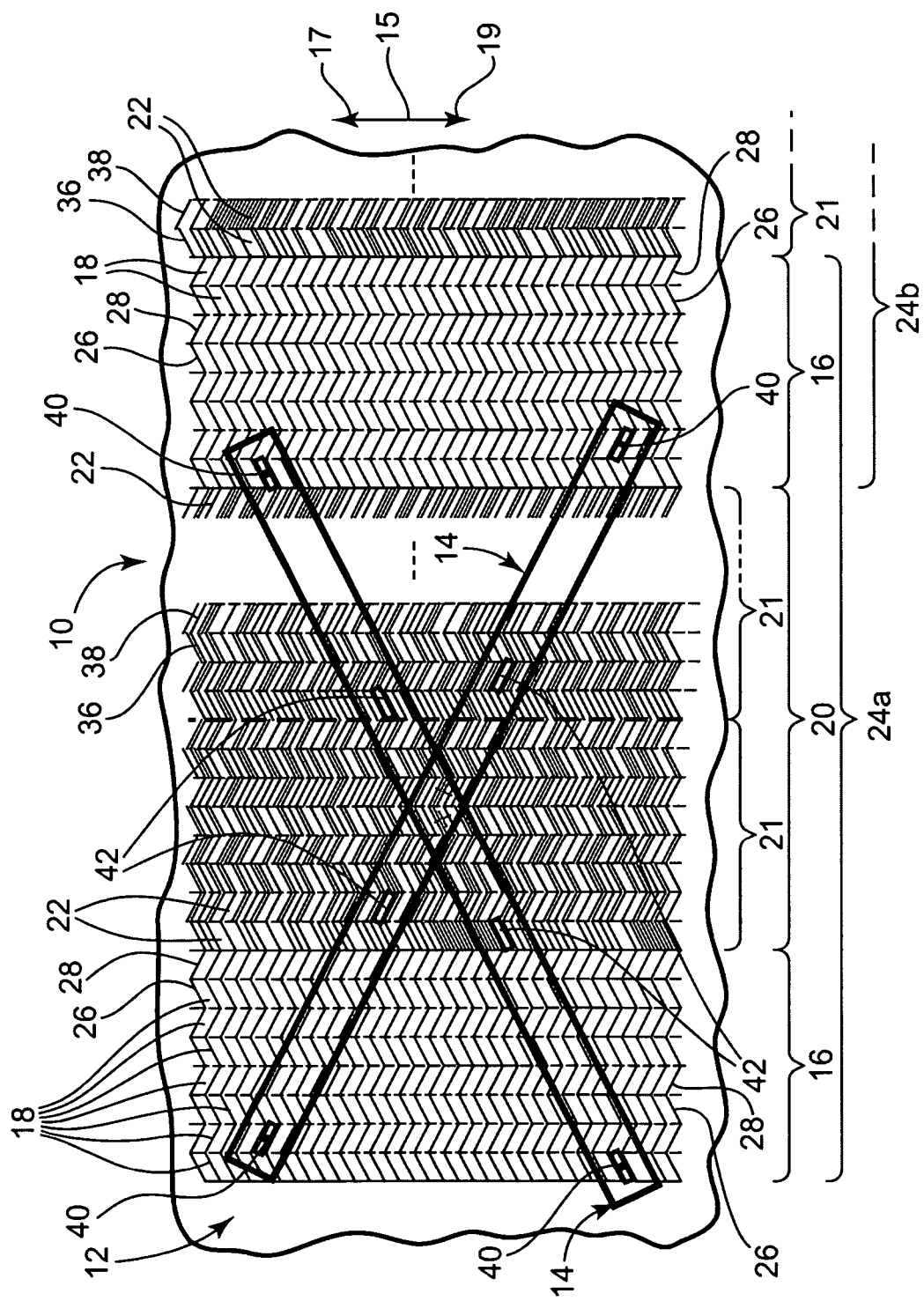
FIG. 2 is a more detailed, schematic plan view of a portion of the magnetic recording tape of FIG. 1, wherein the head is shown engaging the tape in two alternate positions.
Figure 3:
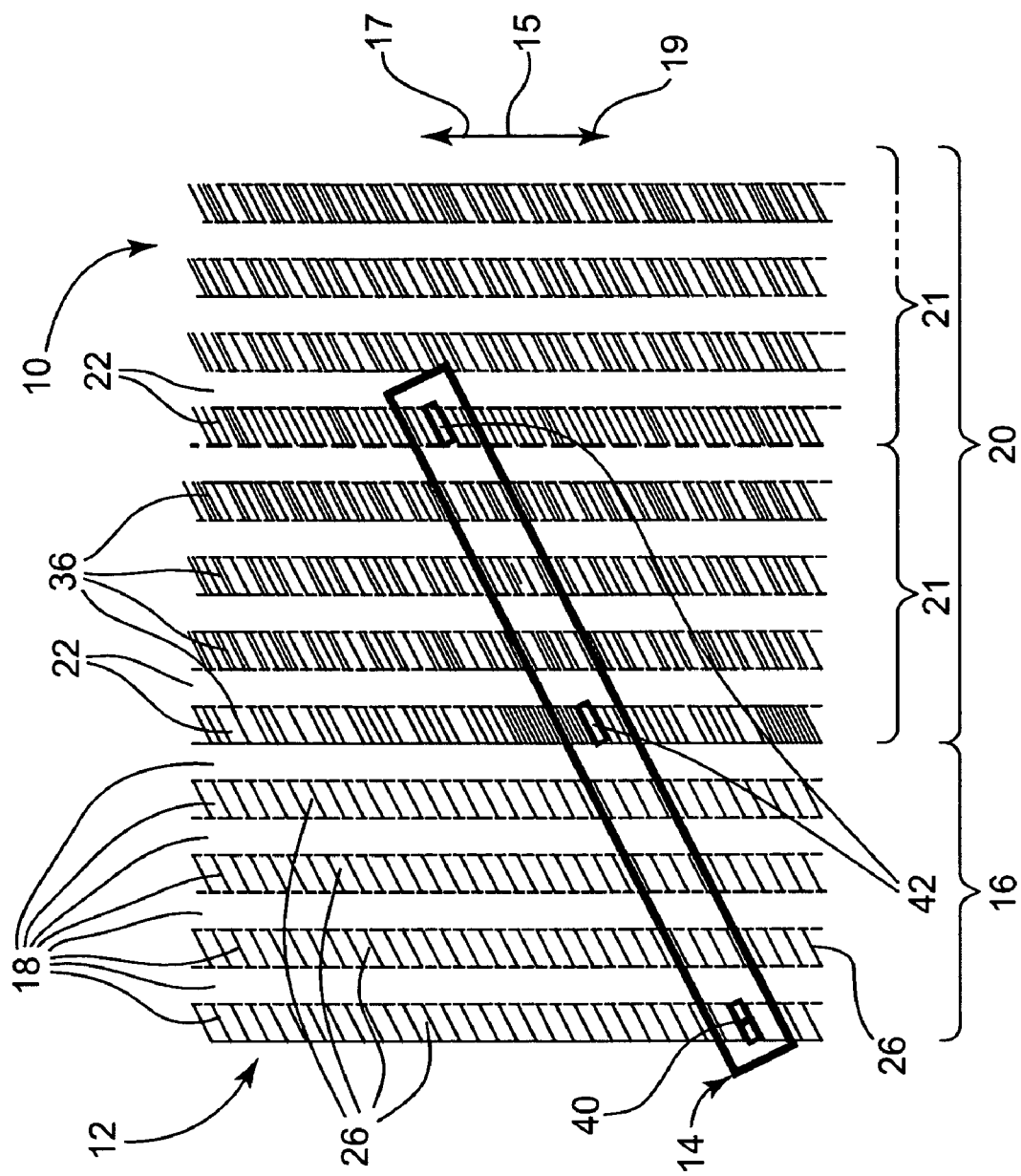
FIG. 3 schematically shows how the signal for adjacent, negative (or positive) azimuth style servo and data transitions of the magnetic recording tape shown in FIGS. 1 and 2 is suppressed when the head sensors are oriented at an opposite, positive (or negative) azimuth angle.

FIGS. 1, 2, and 3 schematically show one embodiment of a data storage system 10 of the present invention that combines azimuth servo features, azimuth data features, and servo and data transducers that are generally co-linear and/or are parallel to the corresponding azimuthal transitions of the servo and data bands during reading, writing, and erasing operations. System 10 is in the exemplary form including a magnetic recording tape 12 (a portion of the length being shown) that is readably, writingly, and erasingly coupled to read/write head 14.

Tape 12 includes one or more servo bands 16 and one or more data groups 20 as components in a multi-channel, linear, serpentine tape system. The number of servo bands 16 and data groups 20 may vary depending upon factors such as the desired recording density, the tape width, the servo scheme being used, separation of data channels, and the like in accordance with conventional practices. The number of servo bands 16 may be less than, the same as, or greater than the number of data groups 20. Typical magnetic recording tapes may include 4 to 50 data groups 20 and a corresponding number of associated servo bands arranged in data/servo groups across the full width of the tape 12. For purposes of illustration, tape 12 as shown happens to include five servo bands 16 and four data groups 20 arranged in four data/servo groups 24a, 24b, 24c, and 24d.

In the particular preferred embodiment shown in FIGS. 1 though 3, each data/servo group 24a, 24b, 24c, and 24d generally refers to a data group 20 and the one or more associated servo bands 16 used to assist track guidance in the data group 20 during data record, write, and/or erase operations. The same servo band 16 may be associated with more than one data group 20, and hence such servo band 16 may be a member of more than one data/servo group. In preferred embodiments as shown, a data group 20 shares a common servo band 16 with one or more adjacent neighbor data group(s) 20 to form data groups 24a, 24b, 24c, and 24d. An alternative servo scheme will be described below in which each data/servo group on a tape includes a single servo band and a single, adjacent data band, wherein a center-tapped servo head that engages the servo band is used to assist tracking in the adjacent data group.

Still referring to FIGS. 1 through 3, but as best shown in FIG. 2, each servo band 16 comprises a plurality of servo tracks 18. The number of servo tracks 18 included in each servo band 16 need not be the same as is used in the other servo tracks 18, but often each servo band 16 incorporates the same number of servo tracks 18 to ease the implementation of servo operations. The number of servo tracks 18 to be used can vary over a wide range depending upon factors noted above as well as the number of data channels, the desired width of each servo band, the number of data transducers to be simultaneously guided, and the like. Typical servo bands 16 might include 15 to 50 servo tracks 18. For purposes of illustration, six are shown.

The servo tracks 18 include azimuthal servo transitions 26 and 28, wherein transitions on adjacent servo tracks are written at alternating azimuthal angles θ and φ, respectively, relative to a perpendicular to the length dimension of tape 12. Generally, the angle θ of servo transitions 26 along a particular servo track 18 is positive (or negative) while the angle φ of servo transitions 28 on adjacent servo track(s) 18 is negative (or positive). Most typically, θ=φ for practical reasons, and the azimuth angle of the transitions in such instances may simply be given by θ, with the understanding that the azimuth angle θ alternates from positive to negative from track to track. The transitions 26 and 28 thus form zigzags, or herringbone patterns, across the width dimensions of servo bands 16.

The magnitudes of the azimuth angles θ and +may independently vary over a wide range. Generally, if either of θ and φ is too small, the desired degree of suppression of servo signal from an adjacent track may be less than desired. If the angle is too large, e.g., above about 45° C., the angle shifts practically from being positive to negative (or negative to positive) such that the desired degree of suppression of the servo signal from an adjacent track may be less than desired. As general guidelines, the absolute magnitudes of θ and φ independently may be in the range of from about 5 degrees to 45 degrees for one and from about −5 degrees to −45 degrees for the other.

The present invention may be practiced in combination with large angle azimuth recording (LAAZR) of servo and data transitions, which is described in U.S. Pat. No. 6,947, 247, which is incorporated herein by reference in its entirety.

The servo transitions 26 and 28 preferably can be recorded up to a density comparable to the maximum data density. In this manner the suppression of the servo signal from the adjacent servo tracks is maximized. Preferably and as illustrated, the pattern of servo transitions 26 and 28 is monofrequency (density) among all servo bands 16. This provides a very high sample rate, very narrow band width, servo signal; a great amount of noise rejection capability through oppositely biasing the servo elements creating a differential position error signal, PES; very narrow bandpass filtering; a high signal-to-noise-ratio, SNR; and good common-mode noise and signal modulation rejection.

Although the azimuthal servo pattern preferably is a single mono-frequency signal, it is possible to vary the density or phasing of the transitions 26 and/or 28, e.g., to provide manufacturing or tape location (along the track) information as is done in the commercially well known LTO tape cartridge. Alternative embodiments of the invention incorporating tape and track locating features are described below.

Each data group 20 is further divided into a plurality of data bands 21. Each data band 21 is further subdivided into a plurality of data tracks 22. A data band 21 generally refers to a group of data tracks 22 serviced by the same data sensor 42. For purposes of illustration, each data group 20 includes four data bands 21. It is recognized that there could more or less than four data bands 21 in a data group 20. Typically, a data group 20 might include 8 to 16 track groups to achieve a high data/servo ratio for efficiency. Similarly, the number of data tracks 22 included in each data band 21 can vary over a wide range, but typically is in the range of 50 to 500. For purposes of illustration, each data band 21 includes six data tracks 22, which matches the number of servo tracks 18 in an associated servo band 16. The ratio of servo tracks 18 to the number of data tracks 22 in each data band 21 need not be 1:1 in all cases. The ratio can be less than 1:1, for instance, as might be the case when using a multi-channel servo head. Alternatively, this ratio might be greater than 1:1 when using a centertapped servo head.

Preferably, in a manner similar to servo tracks 18, it is preferred that data tracks 22 also include azimuth style data transitions 36 and 38. The azimuth angles of transitions 36 and 38 preferably match the azimuth angles of associated servo transitions 26 and 28, respectively. Consequently, as a servo signal is being derived from servo track(s) 18 having servo transitions recorded at a particular azimuth angle, and as a consequence of the manner in which data transducers are correspondingly angled in azimuth fashion during tape operations, corresponding data signals may be obtained from a plurality of data tracks 22 whose transitions are characterized by generally the same azimuth angle as such servo track(s). Signals from adjacent servo and data tracks 18 and 22 will tend to be suppressed. See also the discussion of FIG. 3, below, where this desirable suppression effect is discussed further.

Still referring collectively to FIGS. 1 through 3, but primarily to FIG. 2, head 14 generally includes one or more servo transducers 40 and one or more data transducers 42. The servo and data transducers 40 and 42 preferably are co-linear and/or are parallel to the azimuthal servo and data transitions being read, written, or erased. Thus, the transducers 40 and 42 also preferably are disposed at azimuthal angles relative to the tape 12. FIG. 2 shows head 14 oriented in two azimuthal positions. In one position, the sensors 40 and 42 in head 14 are aligned in azimuth fashion with transitions 26 and 36. In the other position, the sensors 40 and 42 in head 14 are aligned in azimuth fashion with transitions 28 and 38. During reading, writing, and erasing operations, the servo transducers 40 detect a servo signal with high signal to noise characteristics from particular servo track(s) 18, with desirable signal suppression from adjacent tracks having transitions at a generally opposite azimuthal angle. Characteristics of the servo signal are used with a suitable control algorithm to keep the servo transducer heads 42 in proper registration with the servo track(s) 18 so that corresponding data transducer head(s) 42 remain properly registered with corresponding data track(s) 22.

The tape 12 is bi-directional relative to head 14 along the length dimension of tape 12 (as indicated by bi-directional arrow 15) so that tape 12 can move past head 14 in either a first direction 17 or second direction 19. Head 14 also may be capable of relative movement across width dimension of tape 12 so that the servo transducer(s) 40 can engage additional servo track(s) 18 (and servo bands 16) for corresponding registration of data transducers 42 with additional data tracks 22 (and data bands 18). Head 14 is further capable of relative rotational movement in a range that includes at least the two orientations of head 14 shown in FIG. 2. This allows servo and data transducers 40 and 42 to be aligned with positive (negative) transitions in one orientation and negative (or positive) transitions in the other orientation. Alternately, two separate, but identical heads oriented at alternate azimuth angles may be employed.

FIG. 3 schematically illustrates the suppression of signals from adjacent servo and data tracks when using the data recording system 10 of FIGS. 1, 2. FIG. 3 shows head 14 in an orientation such that servo and data transducers 40 and 42 are generally aligned with servo and data transitions 26 and 36 oriented at a positive (or negative) azimuth angle. Because the servo and data transitions 28 and 38 on adjacent tracks are oriented at an opposite azimuth angle, signals from those adjacent tracks are greatly suppressed. This is shown schematically in FIG. 3 by the omission of the transition features of those adjacent tracks.

FIGS. 1, 2, and 3 show an illustrative system 10 in which the servo and data transducers 40 and 42 generally are centered over the corresponding servo and data tracks 18 and 22 during reading, writing, and erasing operations. A position error signal (PES) is generated whose character generally depends upon the degree to which the servo transducer(s) 40 drifts away from a centered position over the servo track being engaged.

The particular embodiment shown in FIGS. 1, 2, and 3 illustrates a servo scheme in which two servo transducers 40 in two, separate, spaced apart servo bands 16 are used for track guidance in a data band 24 positioned between the two servo bands 16. Either centertapped and/or non-centertapped heads may be used for such servo operations. "On-track" positioning is determined by balancing or otherwise comparing the output of the two servo transducers 40. Because of the spatial separation of the two servo transducers 40, potential servo signal error can occur from at least two sources. First, the individual transducers 40 can be dissimilar. Hence, their amplitude characteristics and cross-track profiles might also differ. Second, defects affecting one transducer 40 and not the other could introduce an additional error factor. This can be partially ameliorated by using the outputs of tranducers 40 as sliding references so that if one is not changing, the position is held. For instance, a position error signal might only be generated if the outputs of both transducers 40 are changing in opposite directions.

Consequently, a more preferred servo scheme involves using a single, center-tapped, servo transducer preferably in a single servo band 16 for track guidance in an adjacent data band 24. A single servo transducer that is "split" or centertapped is able to provide information of whether the transducer is off-track to the right or to the left without requiring a separate servo transducer in the same or different servo band. The amplitude of the signals from the right and left halves are compared to produce the position error signal. Centertapped magnetoresistive heads are well known, such as the read transducers on the IBM Corporation 3480 head, to the tape industry and have been described, for example, in U.S. Pat. No. 5,079,663.

Figure 4A:
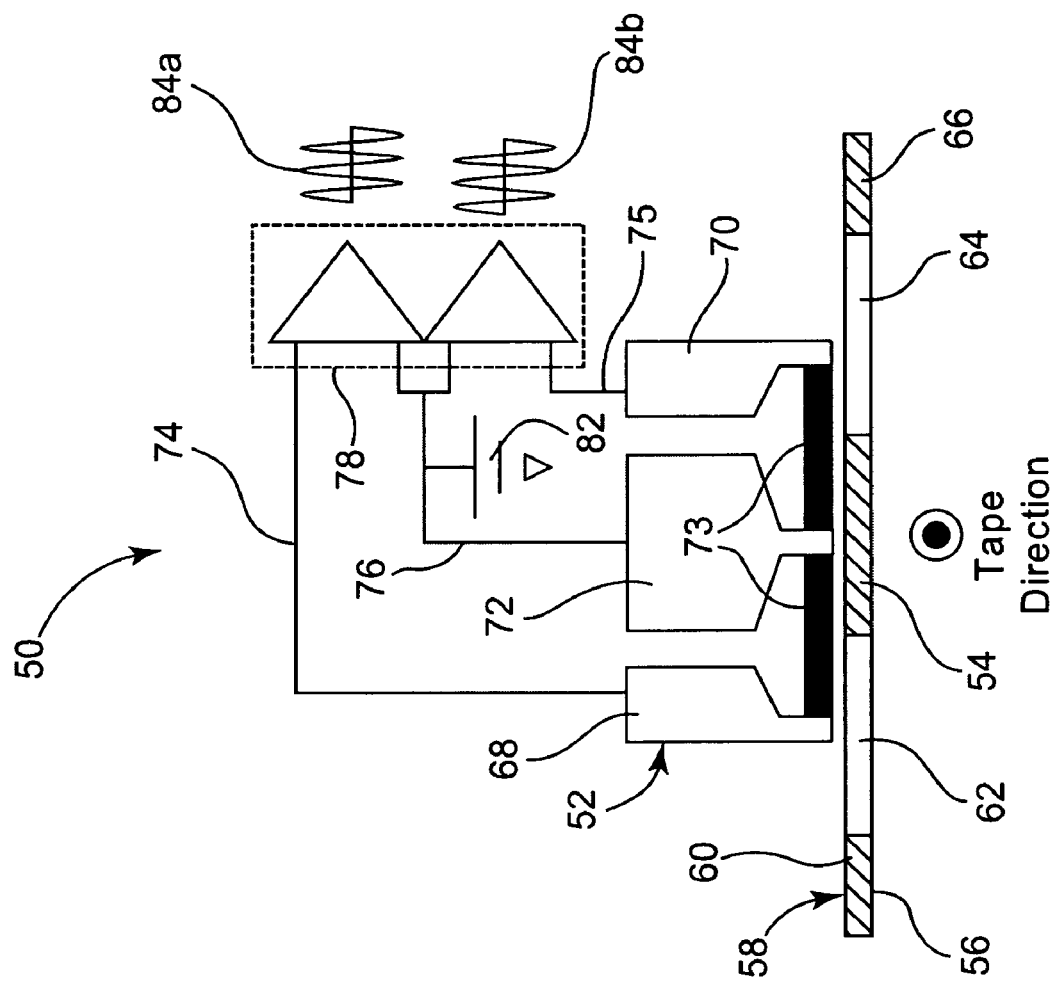
FIG. 4a schematically shows how a centertapped servo read head detects a servo signal when centered over an underlying servo track when the head and track are oriented at generally the same azimuth angle.
Figure 4B:
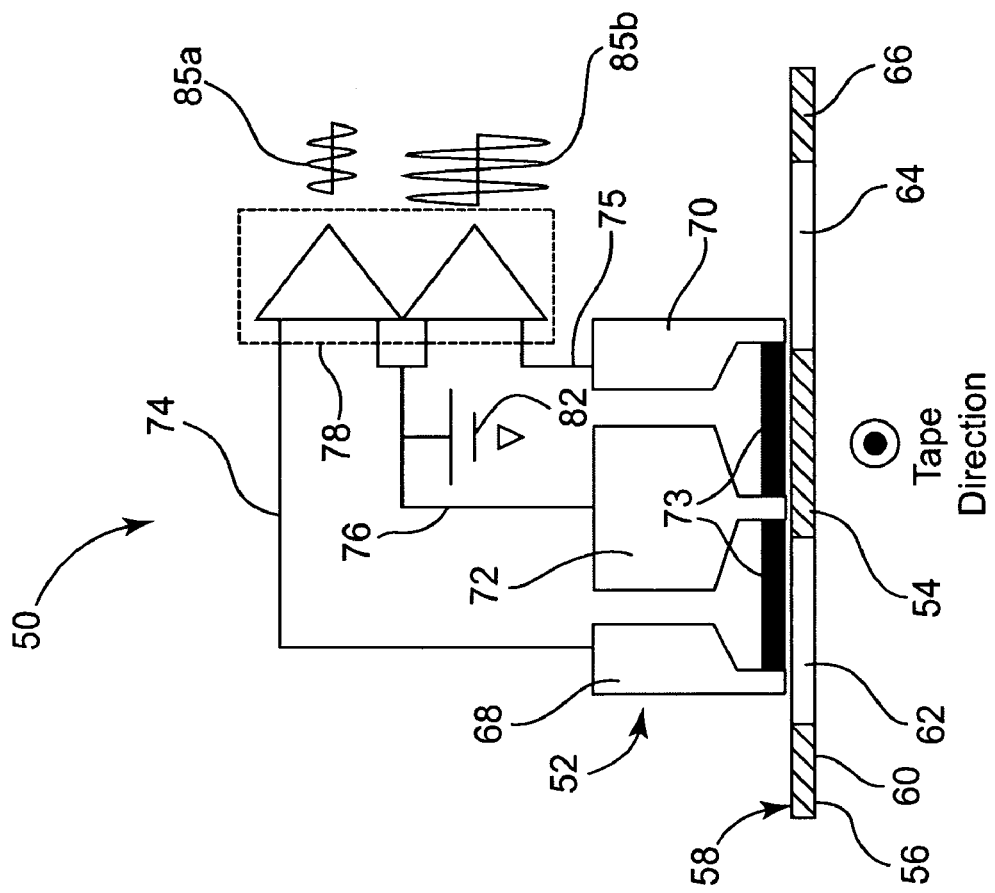
FIG. 4b schematically shows how a centertapped servo read head detects a servo signal when to the left of a centered position over an underlying servo track when the head and track are oriented at generally the same azimuth angle.
Figure 4C:
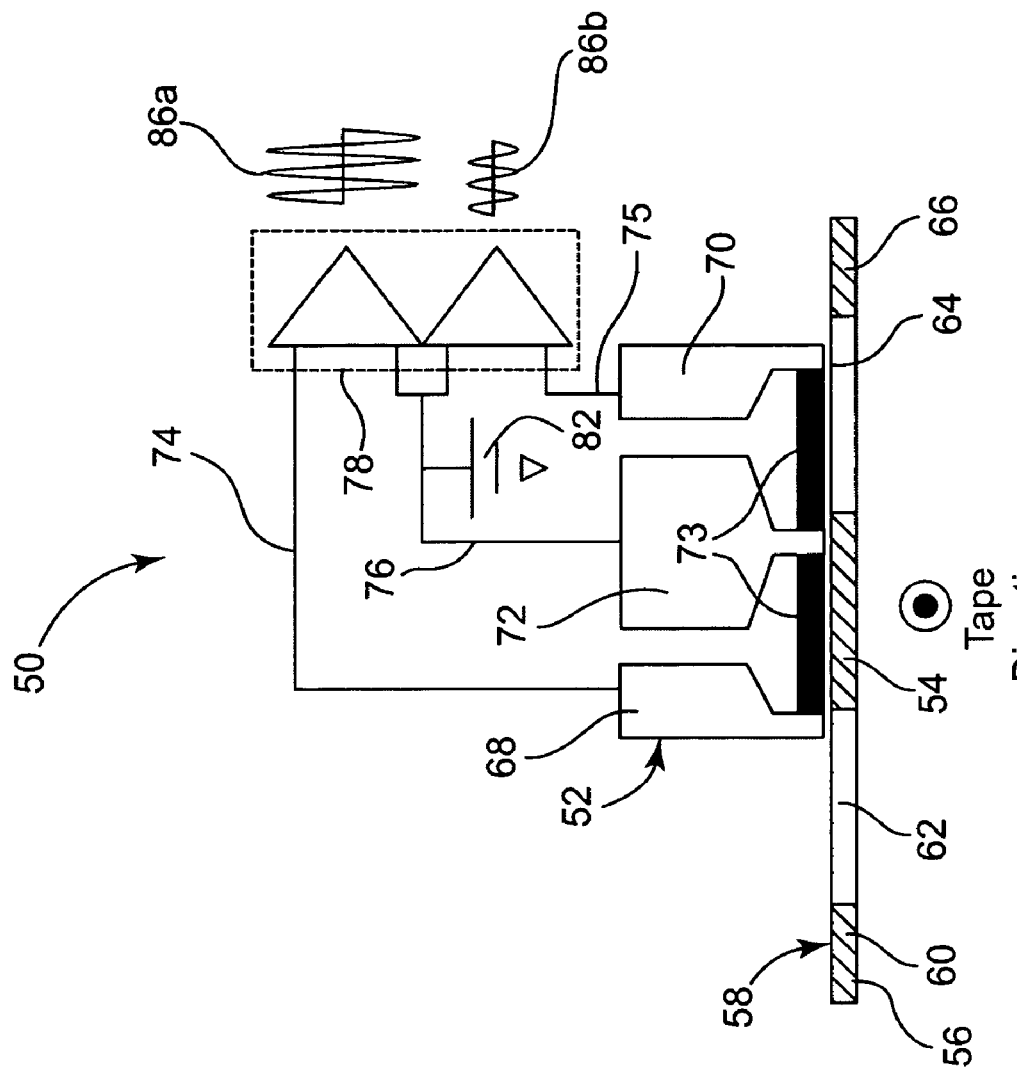
FIG. 4c schematically shows how a centertapped servo read head detects a servo signal when to the right of a centered position over an underlying servo track when the head and track are oriented at generally the same azimuth angle.

The approach of using a single, centertapped servo transducer to generate a suitable servo signal without requiring the use of additional servo heads on nonadjacent servo bands is shown schematically in FIGS. 4a, 4b, and 4c. The suppression of servo signals from adjacent servo tracks makes this approach very accurate. FIGS. 4a, 4b, and 4c show data recording system 50 that includes center-tapped servo read head 52 readily engaging a particular servo track 54 in a servo band 56 of magnetic recording tape 58. Servo band 56 further includes at least other servo tracks 60, 62, 64, and 66.

Center-tapped servo read head 52 includes left lead 68, right lead 70, centertap 72, and sensors 73. Conductors 74 and 75 respectively couple leads 68 and 70 to servo amplifiers/filters 78 and 80. Centertap 72, conductor 76, and servo amplifiers/filters 78 and 80 are coupled to common ground 82. The amplitude of the signals from the right and left halves are compared to produce the position error signal. For example, in FIG. 4a, head 52 is centered over servo track 54. The amplitudes of output signals 84a and 84b are generally the same, indicative of the desired "on track" centered position. In FIG. 4b, head 52 is left of center of servo track 54. The amplitude of output signal 85a is greater than that of output signal 85b, indicative of head 52 being left of center. In FIG. 4c, head 52 is right of center of servo track 54. The amplitude of output signal 86a is greater than that of output signal 86b, indicative of head 52 being right of center.

Figure 5:
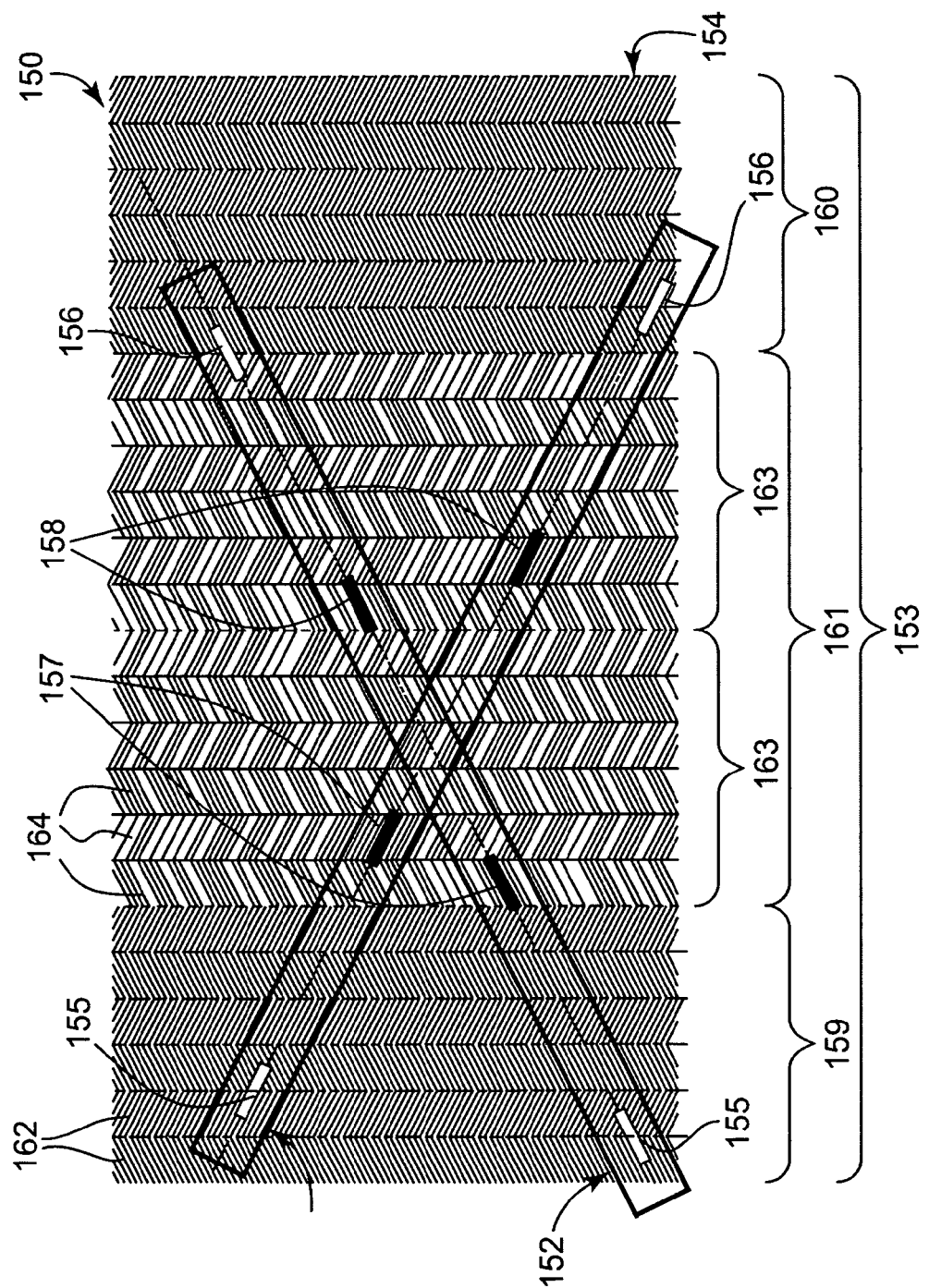
FIG. 5 schematically shows an alternative embodiment of a data storage system of the present invention in which a thin film magnetic head is engaging a magnetic recording tape, wherein the head is shown as engaging the tape in two alternate positions.

FIGS. 1, 2, and 3 show a servo approach in which centertapped servo transducer(s) are centered over a particular servo track when "on track". FIG. 5 shows an alternative approach in which the servo elements are not centertapped. System 150 includes head 152 engaging a data/servo group 163 constituting a portion of a magnetic recording tape 154. Head 152 includes servo sensors 155 and 156. Head 152 also includes data sensors 157 and 158. Sensors 155, 156, 157, and 158 are co-linear. FIG. 5 shows head 152 in two, alternate azimuthal positions.

Data/servo group 163 includes servo bands 159 and 160 and data group 161. Each of servo bands 159 and 160 includes six azimuth style servo tracks 162. Data group 161 includes two data bands 163, each containing six azimuth style data tracks 164. Each of data sensors 157 and 158 engage data tracks 164 in a corresponding data band 163. Each of the servo sensors 155 and 156 is oppositely offset by a half of a servo track width such that it is centered on the junction of two opposite azimuth tracks. A servo signal is readily detected from the underlying portion of the particular servo tracks whose azimuthal transitions generally are aligned with the servo transducers, while the signals from the adjacent, underlying tracks (whose transitions are angled oppositely) are suppressed.

Figure 6:
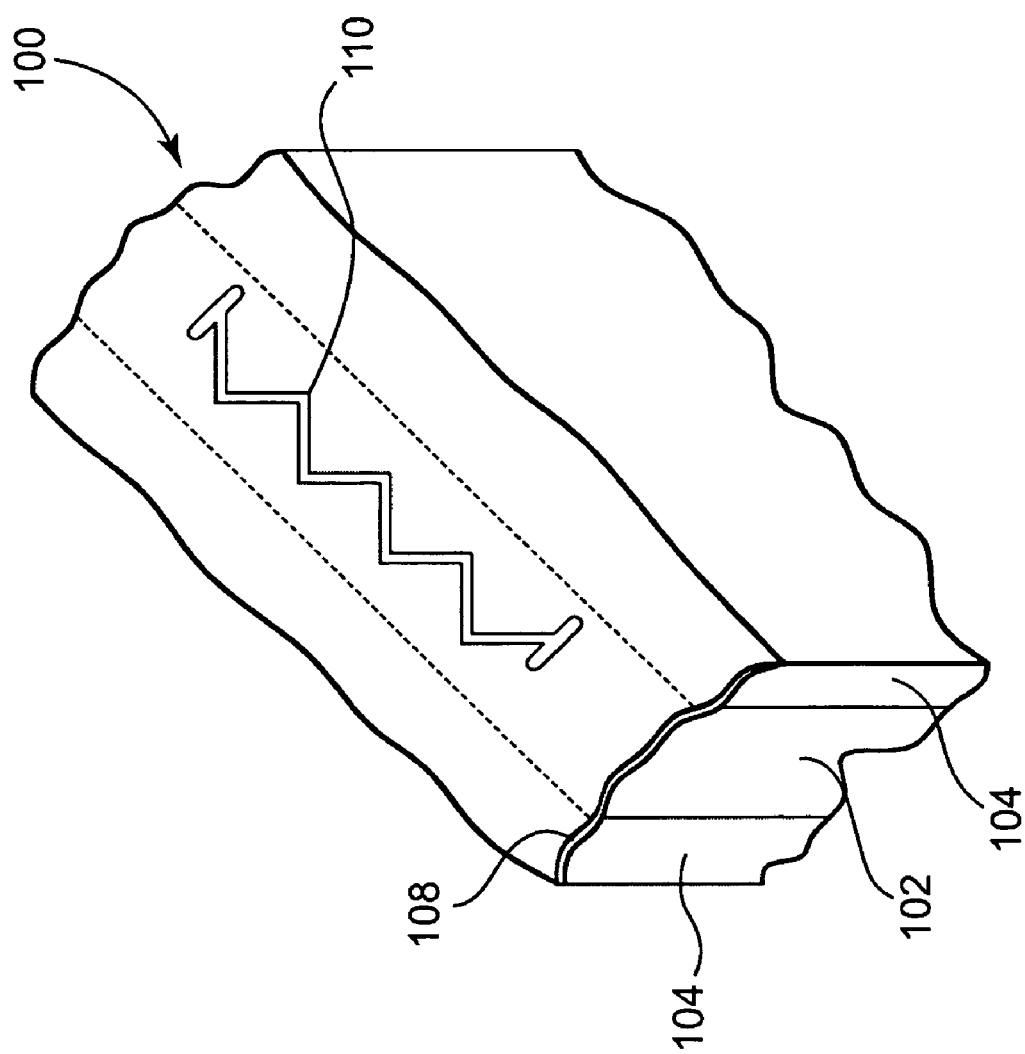
FIG. 6 schematically shows a perspective view of a portion of a servo writer head containing a zigzag writing gap with, for purposes of illustration, six legs for forming azimuth transitions in a servo band containing six servo tracks.

FIG. 6 schematically illustrates one embodiment of a servowriter head 100 that may be used to produce the azimuth style, or zigzag, servo transitions of the present invention. Head 100 generally comprises a layered structure including a suitable subgap layer 102 that is positioned between two poles 104 and 106. The subgap layer 102 may be made from a ceramic or other suitable nonmagnetic material that may be thin film deposited. Poles 104 and 106 may be made from a ferrite or other suitable magnetic material and may be in the form of a thin film if desired. A magnetic thin film layer 108 overlies layers 102, 104, and 106. Servowriter pattern 110 is formed in magnetic thin film layer 108 and has an azimuthal pattern for forming corresponding, azimuthal, zigzag transitions across the width of a servo band on a data recording medium. In this embodiment, the pattern 108 contains six alternating azimuths for forming six corresponding servo tracks. Head 100 is shown with only one azimuthal pattern

108. In some applications, e.g., for high track densities, wide tape, or few data channels, head 100 may include a plurality of such patterns spaced apart across head 100 corresponding to the desired spacing and number of servo bands that are desired.

Head 100, including any desired servo pattern(s), may be fabricated in accordance with procedures described in U.S. Pat. Nos. 6,496,328; 6,269,533; as well as U.S. Pat. Nos. 6,678,116; 6,894,869; and 6,989,960, each of which is incorporated herein by reference in its entirety. Additional kinds of servo heads that may be used in practicing some embodiments of the present invention have been described in U.S. Pat. Nos. 5,572,392 and 5,652,015, both of which are incorporated herein by reference in their entireties. A particularly preferred style of servo write head that may be used in the practice of the present invention includes thin film sub-poles and thin film coils and is described in Assignee's co-pending U.S. provisional patent application 60/568,139 titled Arbitrary Pattern Thin Film Surface Film Head in the names of Dugas et. al., filed May 4, 2004, and having, the entirety of which is incorporated herein by reference. Preferred structures used at the ends of writing gaps to help write transitions more accurately with lesser stray writing are described in U.S. patent application Ser. No. 10/683,809 titled Patterned Magnetic Recording Head with Termination Pattern Having Curved Portion, naming as an inventor Matthew P. Dugas, filed Oct. 10, 2003, and having, the entirety of which is incorporated herein by reference.

As noted above, there are advantages to using a center-tapped servo read head to detect servo information from a single servo band. However, previously, only non-center-tapped heads have been used on a widespread commercial basis in narrow data track situations because of the required centertap width for effective current carrying capability, resistance to signal loss, high signal to noise ratio, manufacturability, and reliability. Centertapped servo heads have tended to be too wide to pick up clean servo signals of interest without also spanning, and thereby picking up undesired signal information from, one or more adjacent servo tracks.

For example, a conventional servo head might be on the order of 2.8 micrometers wide to read conventional high density, servo tracks. If such a servo head were centertapped, the centertap would need to be around 0.7 micrometers wide to fit in a head of such dimensions. This is too narrow to work effectively. For narrow tracks (<5 μm) this results in reliability and current density problems in the centertap. To achieve effective current carrying capability, resistance to signal loss, high signal to noise ratio, manufacturability, and reliability, a centertap typically is at least 4 micrometers in width.

Consequently, there is some bias in the industry against using a centertapped servo read head for servo operations in high density data track situations. The present invention, however, advantageously includes a number of features that singly or in combination allow center-tapped servo read heads to be used effectively to guide reading, writing, and erasing operations over a wide range of low and high density data applications, but is especially useful for high density data applications in which the data track pitch, $T_d$, is about five micrometers or less, preferably about 0.5 to about 2 micrometers. Singly or in combination, these features offer increased (e.g., doubled) signal amplitude, increased capture range, and a higher signal to noise ratio.

As one such feature, the azimuth (zigzag) character of the servo transitions, especially when used in combination with a centertapped servo read head canted at either the positive or negative azimuth angle, as the case may be, is very useful in facilitating the use of a centertapped servo head. Recall from the discussion above that a read head oriented at a particular azimuth will pick up a strong servo signal from an underlying servo track having servo transitions recorded at a similar azimuth angle, but will pick up very little signal from adjacent tracks written at the opposite (positive v. negative) azimuth angle. Thus, a center-tapped servo head can be wider than a particular azimuth style servo track of interest.

The present invention also appreciates that a center-tapped servo read head can span several servo tracks such that the servo sensors pick up servo signals for comparison from two, nonadjacent servo tracks. Preferably, the servo tracks of interest have servo transitions with similar azimuth angles to each other, and the servo sensors are generally canted at a similar azimuth angle so as to minimize any signal detectable from intervening and/or adjacent servo tracks. In short, the present invention appreciates that the centertap of a center-tapped servo need not be narrow to guide data reading, writing, and erasing operations. The centertap in fact can be arbitrarily wide. Preferably, the centertap width is a multiple of the track pitch to facilitate precise track to track movement of servo and data sensors.

Even though the centertap width can be arbitrarily wide, in practice it is desirable to have it be as narrow as possible, yet still meet reliability and fabricability requirements. Generally, this means that the width of the centertap needs to be greater than about 4 μm. Preferably, for servo band(s) of uniform servo track pitch and alternating tracks having respective azimuth angles of $\theta$ and $-\theta$, then the centertap width is given by $wT_s$, where w>1 and $T_s$ is the servo track pitch. More preferably, the centertap width W is increased by the equivalent of $nT_s/\cos \theta$, where n is an integer equal to 2 or more; $\theta$ is the positive value of the azimuth angle ($\theta$=0 for conventional recording) of the servo transitions; and $T_s$ is the servo track pitch. The servo band width preferably is correspondingly increased by the increased span of the centertap.

As another feature that may facilitate use of centertapped servo heads in the practice of the present invention, although the track pitch $T_s$ of the servo tracks may be the same as or different than the track pitch $T_d$ of the data tracks, it is more preferred that $T_s > T_d$. Preferably, $T_s = mT_d$, where m is an integer greater than 1 and preferably is 2. That is, the pitch of the servo tracks is wider than the data track pitch $T_d$, and preferably is about doubled ($2T_d$).

As still another feature that may facilitate use of center-tapped servo heads in the practice of the present invention, the widths of the servo sensors may be increased relative to conventional practice. This is especially useful to use in combination with wider servo tracks. Preferably, each sensor in the centertapped reader has a width in the range from about $1.2T_d/\cos$ to about $2T_d/\cos \theta$, where $\theta$ is the positive value of the azimuth angle and $T_d$ is the corresponding pitch of the data tracks.

Figure 7A:
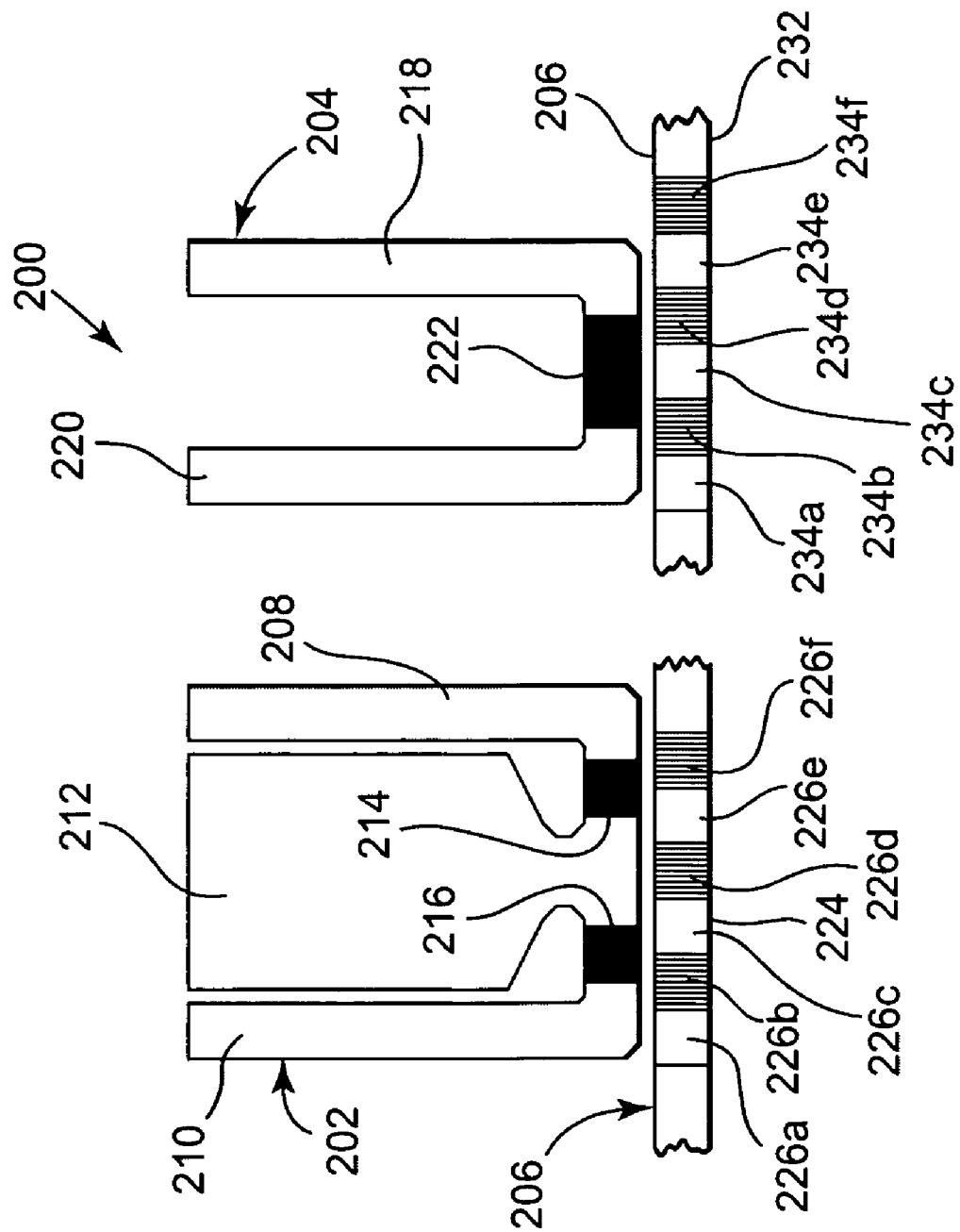
FIG. 7a schematically shows a side view shown in cross section of a data storage system of the present invention in which a centertapped servo head and an associated data head engage a magnetic recording tape, wherein the centertap is sufficiently wide such that the servo sensors engage nonadjacent servo tracks.
Figure 7B:
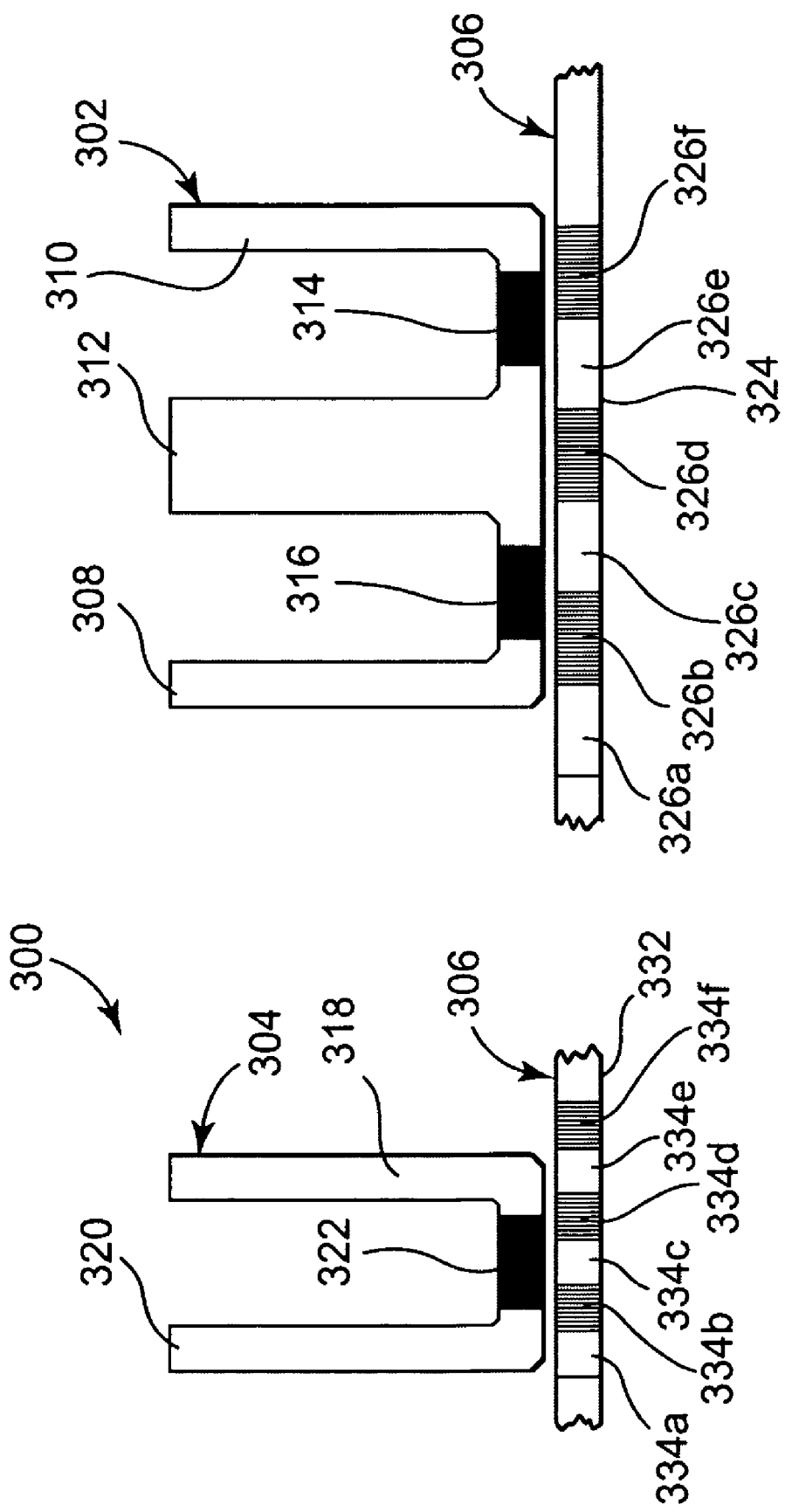
FIG. 7b schematically shows a side view shown in cross section of a data storage system of the present invention in which a centertapped servo head and an associated data head engage a magnetic recording tape, wherein the centertap is sufficiently wide such that the servo sensors engage nonadjacent servo tracks, wherein the servo track pitch is enlarged relative to the data track pitch, and wherein the servo sensor widths are further enlarged to generally correspond to the enlarged servo track pitch.

Representative advantages of the increased width servo tracks and servosensors, e.g., doublewide tracks and sensors are shown in FIGS. 7a, and 7b. FIG. 7a shows a data recording system 200 of the present invention comprising servo head 202 and data head 204 engaging magnetic recording tape 206. Servo head 202 includes right lead 208, left lead 210, wide center tap 212, first sensor 214, and first sensor 216. Data head 204 includes right lead 218, left lead 220, and sensor 222. Tape 206 includes at least one servo band 224 including a plurality of servo tracks 226a, 226b, 226c, 226d, 226e, and 226f containing azimuth (zigzag) servo transitions (not shown). Centertap 212 is wide enough such that sensors 214 and 216 engage non-adjacent servo tracks 226b and 226f. Note that representative servo track 226f is characterized by a capture range R that is about as wide as the servo track pitch.

Tape 206 further includes at least one data group 230 incorporating at least one or more data bands, one data band 232 being shown. Data band 232 includes data tracks 234a, 234b, 234c, 234d, 234e, and 234f.

Sensors 214 and 216 have a width that is similar to the width of servo track 226f. Servo track 226f, in turn, has the same pitch as the data tracks 234.

Yet, in a situation where the servo sensors are used for tracking on alternate data tracks, such as in azimuthal recording, the servo tracks and servo sensors can be increased in width, preferably up to approximately double the data track width. This allows up to a doubling of the servo signal amplitude, doubling of the capture range, and decreased sensitivity to media defects.

Thus, FIG. 7b shows a data recording, playback, and erase system 300 that is similar to system 200 of FIG. 7a, except that wider sensor, centertap, and servo track features are used in the servo aspects. Specifically, data recording system 300 of the present invention comprises servo head 302 and data head 304 engaging magnetic recording tape 306. Servo head 302 includes right lead 308, left lead 310, wide center tap 312, first sensor 314, and first sensor 316. These are twice as wide as those of FIG. 7a. Data head 304 includes right lead 318, left lead 320, and sensor 322. Tape 306 includes at least one servo band 324 including a plurality of servo tracks 326a, 326b, 326c, 326d, 326e, and 326f containing azimuth (zigzag) servo transitions. The pitch of these is double that of those in FIG. 7a. Centertap 312 is wide enough such that sensors 314 and 316 engage non-adjacent servo tracks 326b and 326f. Tape 306 further includes at least one data group incorporating at least one or more data bands, one data band 332 being shown. Data band 332 includes data tracks 334a, 334b, 334c, 334d, 334e, and 334f. These have the same pitch as those in FIG. 7a.

Because of azimuth recording in the servo band, the servo sensor width can be greater than, and preferably up to about double, the data track pitch, while the optimum servo sensor width is equal at least to the servo track pitch. Note that representative system 300 is characterized by a capture range C that is about as wide as the servo track pitch and is much larger than range R in FIG. 7a. As compared to the servo characteristics of system 200 of FIG. 7a, system 300 of FIG. 7b will tend to provide a stronger servo signal, will tend to have a higher signal to noise ratio, and will tend to be less sensitive to media defects.

Figure 8:
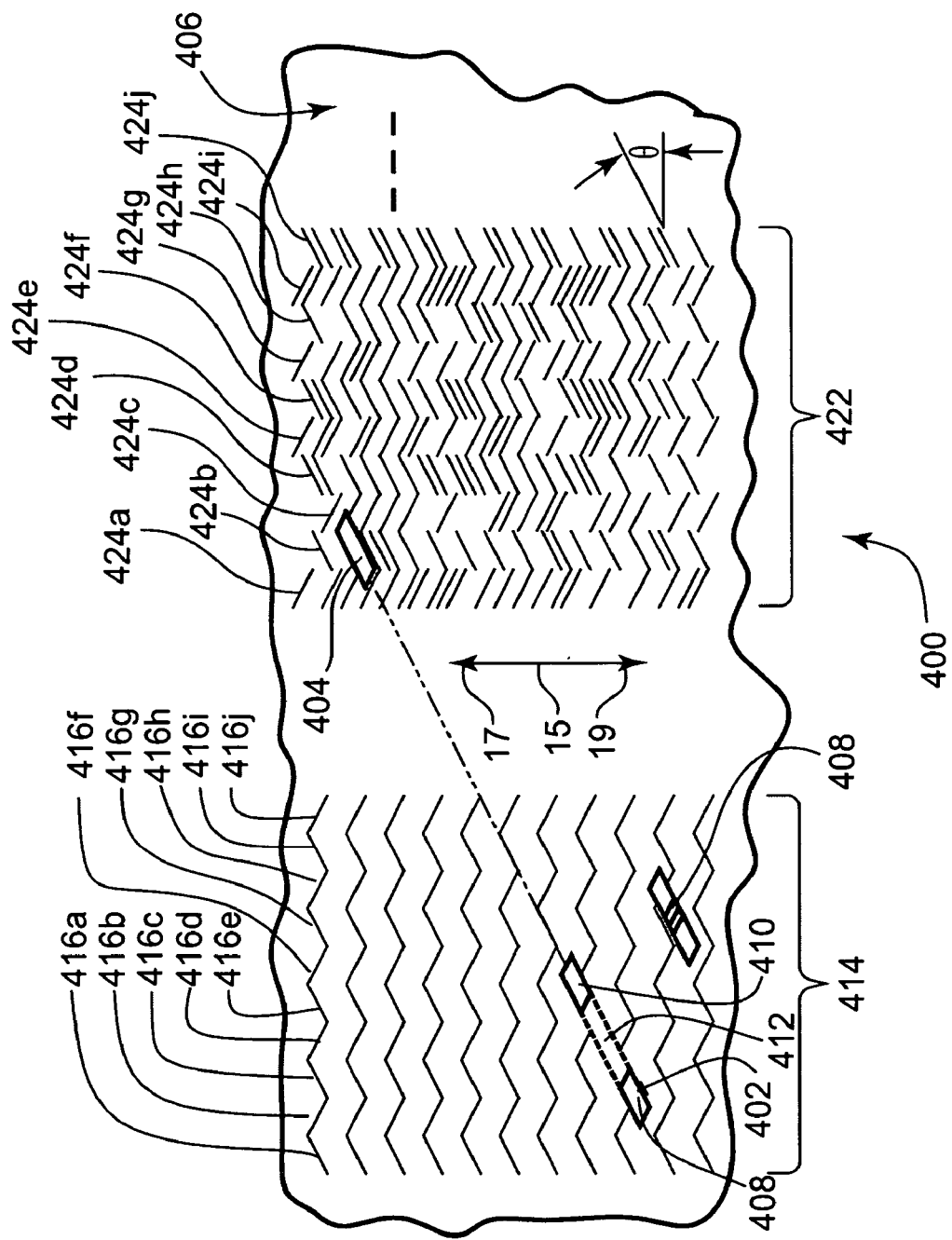
FIG. 8 schematically shows a plan view of a data storage system of the invention in which a thin film head is engaging a magnetic recording tape, wherein the centertap is sufficiently wide such that the servo sensors engage nonadjacent servo tracks, wherein the servo track pitch is enlarged relative to the data track pitch, and wherein the servo sensor widths are further enlarged to generally correspond to the enlarged servo track pitch.

FIG. 8 shows one illustrative embodiment of a data recording system 400 incorporating many of the advantageous servo features described herein. FIG. 8 shows a data recording system 400 of the present invention comprising centertapped servo head 402 and data head 404 engaging magnetic recording tape 406. Servo head 402 is shown schematically as including first sensor 408, second sensor 410, and wide center tap 412. Tape 406 includes at least one servo band 414 including a plurality of servo tracks 416a, 416b, 416c, 416d, 416e, 416f, 416g, 416h, 416i, and 416j containing azimuth (zigzag) servo transitions. Centertap 412 is wide enough such that sensors 408 and 410 engage non-adjacent servo tracks 416c and 416e. Note that sensors 408 and 410 are generally canted at an angle in azimuth fashion so as to be generally parallel to the azimuth angle of the servo transitions in tracks 416c and 416e. For comparison, a more conventionally structured centertap servo read head 418 is schematically shown in the practice of the present invention as engaging a single azimuth servo track 416g.

Tape 406 includes at least one data group incorporating at least one or more data bands, one data band 422 being shown. Data band 422 includes data tracks 424a, 424b, 424c, 424d, 424e, 424f, 424g, 424h, 424i, and 424j, wherein data head 404 is shown as engaging data track 424b. Note that head 404 is generally co-linear with servo sensors 408 and 410 and also generally is canted at an angle so as to be generally parallel to the azimuth angle of the data transitions in track 424b.

Figure 9:
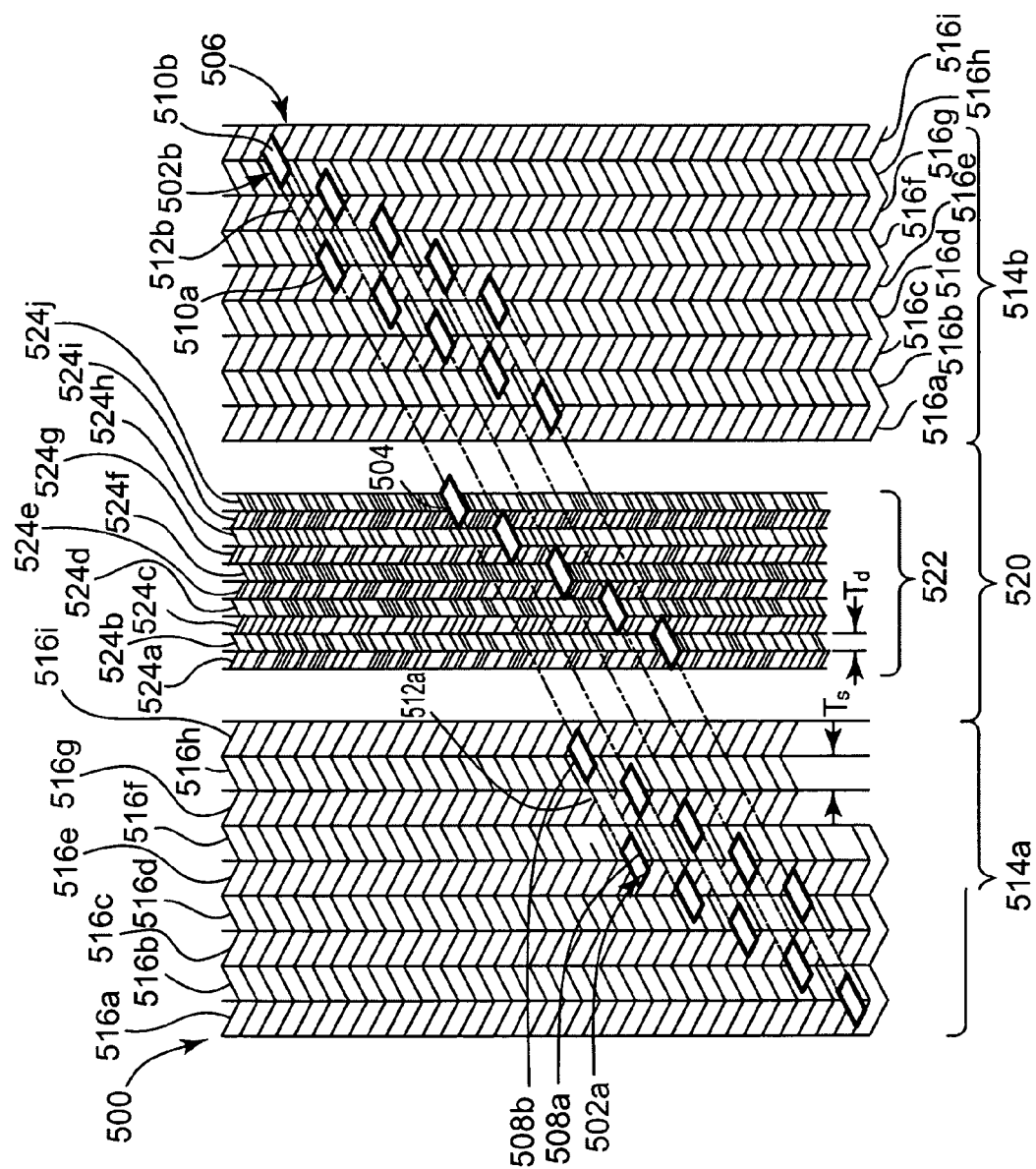
FIG. 9 schematically shows a plan view of a data storage system of the present invention in which a thin film head with a wide centertapped servo structure is shown engaging a magnetic tape in five alternate positions.

FIG. 9 shows another illustrative embodiment of a data recording system 500 incorporating many of the advantageous servo features described herein. FIG. 9 shows a data recording system 500 of the present invention comprising centertapped servo heads 502a and 502b and data head 504 engaging a portion of a magnetic recording tape 506 (five alternative positions of the heads 502 and 504 are shown). Servo signals from each of servo heads 502a and 502b are compared or otherwise coordinated to help guide data head 504 during reading, writing and erasing operations. Servo heads 502a and 502b are shown schematically as respectively including wide first sensors 508a and 508b, wide second sensors 510a and 510b, and wide center taps 512a and 512b. Centertaps 512a and 512b are wide enough such that sensors 508a, 508b, and also sensors 510a and 510a engage non-adjacent servo tracks, respectively. Note that sensors 508a, 508b, 510a and 510b are generally canted at an azimuth angle so as to be generally parallel to the azimuth angle of the servo transitions being read.

The portion of tape 506 that is shown (unshown portions would include additional servo bands and data bands) includes at least two servo bands 514a and 514b including a plurality of servo tracks 516a, 516b, 516c, 516d, 516e, 516f, 516g, 516h, 516i, and 516j containing azimuth (zigzag) servo transitions. The widths $T_s$ of the servo tracks and each servo sensor 508a, 508b, 510a and 510b are increased, e.g., wider than the data track pitch Td, preferably about doubled ($2T_d$), and the centertap is widened in such a manner to allow the servo sensors 508a, 508b, 510a and 510b to span more than one, e.g., several, servo tracks.

Tape 506 includes data group 520 positioned between servo bands 514a and 514b. Data group 520 incorporates at least one or more data bands, one data band 522 being shown. Data band 522 includes data tracks 524a, 524b, 524c, 524d, 524e, 524f, 524g, 524h, 524i, and 524j. Note that head 504 is generally co-linear with servo sensors 508a, 508b, 510a and 510b and also generally is canted at an angle so as to be generally parallel to the azimuth angle of the data transitions in data track 524b.

Note that each servo band 514a and 514b contains ten servo tracks, wherein the azimuth angle of the servo transitions alternates in zigzag fashion from track to track. Thus, each band 514a and 514b contains five alternating servo tracks having servo transitions at a positive (or negative) azimuth angle and five alternating servo tracks having servo transitions at a negative (or positive) azimuth angle. FIG. 9 shows servo heads 502a and 502b in five respective positions accessing all five of the alternate servo tracks in each of the servo bands 514a and 514b containing the ten servo tracks. Likewise, data head 504 thereby is shown in five respective positions accessing all five of the alternate data tracks in the data band 522 containing ten data tracks.

The embodiments of the present invention described above generally include one kind of servo feature (e.g., azimuth servo transitions) encoded in the servo bands to assist in keeping the servo head(s) and the corresponding data head(s) on track. The preferred azimuth servo transitions constitute an amplitude modulated encoding scheme whereby the amplitude of the detected servo signals indicates whether the servo head is on track or not. In other embodiments of the invention, servo bands may include two or more kinds of encoded features to perform multiple servo functions as desired. In preferred embodiments, the encoded features may include amplitude and time based features. For example, the amplitude based encoding features can be used for on track guidance, and the time based encoding features can be used for identification purposes, e.g., track identification and/or group identification. These different kinds of features may be encoded into the same or different sectors along a servo band using one or more servo writing heads comprising one or more write gaps by which track following features are formed and one or more writing gaps by which track identity and/or track group identity features are formed. A representative servo writing head containing both servo guiding and track ID writing gaps is described further below.

In some embodiments of the invention, for example, it is proposed that one or more track identification (ID) sectors would be interspersed along a servo band. From one perspective, the resultant servo band could be viewed as containing servo sectors and ID sectors alternating down the length of a servo band. Embodiments of the invention including this pattern are discussed further below. In addition to track identification, such ID sectors also could provide longitudinal position information during data seeks. Further, each time any the servo elements encounter one of the track/group identity transitions, the element may be energized across its full width. This could provide quasi-continuous amplitude calibration to correct for any variations in the individual sensors sensitivity due to manufacture or drift.

Any suitable servo pattern(s) may be written respectively in the servo sectors or ID sectors of a servo band. The servo sector portions of the band are preferably written with one kind of encoding scheme such as, e.g., amplitude encoded zigzag transitions as described herein, while the ID sectors are encoded with another scheme, e.g., time-base encoding such as "chevrons," "diamonds," "vee or inverted vees," combinations of these, or the like. Such time-base encoding features per se are known and have been described, for example, in U.S. Pat. Nos. 5,930,065; 6,021,013; and 6,282,051.

The spacing and length of such ID sectors along the servo band could vary over a wide range. In theory only two ID sectors would be required, one being at the start and the other being at the end of the tape (keeping in mind tape is often bi-directional). However, in case of loss of position on the tape, it is desirable to include additional ID sectors along the length of the tape. These ID sectors could be spaced as close as a few dozen transitions, but that would not be necessary and would allocate a relatively large percentage of the servo band to track ID features. Preferably, spacing of these ID sectors from 25 mm to 250 mm apart would be adequate. More preferably, these sectors are of such duration as not to affect the tracking ability of the servo system, e.g., less than one percent of the servo track length. At an anticipated servo signal transition density and required sector length, the ID sectors would take up less than 0.4 percent of the servo band at 25 mm spacing.

The length of an ID sector is not critical, but preferably should accommodate one or more factors such as being long enough to include a desired track identity pattern; being short enough so that the servo signal tracking PLO will not drift off frequency; being of constant length across all the servo bands; and the like. ID sectors having a length in the range of 50 μm to 110 μm would be suitable when using time-base encoding features.

According to one approach, the ID sectors could be created by holding a track following servo pattern writer (azimuth pattern writer) in one polarity for the desired sector length, e.g., 50 μm-110 μm. This creates a DC magnetization of the media in that sector. These ID sectors could then be overwritten by pulse by a precisely aligned track/group ID writing head having the desired encoding pattern. This writing would occur at a well-controlled position within the ID sector, based, for example, on the servowriter speed and the distance between the zigzag write gap and the TI gap. This would tend to produce a magnetization in the media, which is of the opposite polarity to the DC magnetization of the sector. The servo signal would be coupled with a narrow band width phase-locked loop, PLO, which could be used to drive the recording circuitry resulting in "constant density" recording vs. constant frequency recording. A preferred technique for creating servo information in a data storage medium is described in Assignee's co-pending U.S. Patent publication No. 2005/0168869, the entirety of which is incorporated herein by reference.

During or after writing the servo bands, track ID characteristics may be established. To accomplish this, a servo band is accessed so that a servo verify read head is phase locked to the first servo track in that band. Only the first band is required for the track following of the servo verify head as all the bands and their signals are instantaneously spatially fixed by the geometry of a single track wide servowriter head that can be used to create the servo bands (see FIG. 15 and its related discussion for a description of such a head). Since each of the servo elements would engage the same azimuth transitions of the chevron across their full length, the first transition can be used to calibrate their amplitudes so any drift in the heads or the channel can be corrected. Since it would be the same transition for both elements and the nominal signal from the tape would be the same, the exact amplitude would not be critical for calibration.

A narrow band width, long time constant phase locked loop is locked to the constant density, track following servo signal from the servo verify sensor, and a precise timing pulse is produced at each clock. The servo channel detects the presence or absence of transitions in the servo signal from the tape. When it detects a gap in the track following portion of the signal it counts the number of clocks between the track following signal and the first track/group identity transition. This count represents the distance between the end of the track following portion of the servo signal and the first track/group identification transition. This count is then stored and recorded in the work area at the beginning of the tape. This is done for the first servo track in both directions, which may be the first transition of each chevron based on the tape direction.

This count may be taken for all the other tracks in the servo band or can be calculated based on the azimuth angle of the track/group identity transitions, servo track width, and the speed of the tape. Using such information to calculate such distances is feasible due to precision photolithography techniques that may be used to very accurately create the writing gap features in a servo writer head that may be used, in turn, to create the servo transition features on a data storage medium. Such a head is described further below in connection with FIG. 15. Preferably, the servo signal density is high enough to produce a sufficient difference in the pulse count from adjacent tracks to keep the tracks distinguishable notwithstanding reasonable tolerances that may later occur. When the tape is used in a tape drive, the record/reproduce head is positioned proximal to the first servo track and then locked to it in the work area where it reads in the pulse count for the first servo track and the other servo tracks or the servo processor calculates the other counts. This count is then compared at the first track/group identification sector and the head moved appropriately as necessary. Subsequently, this process may be repeated at each sector. If the tape should be stopped anywhere along the tape, in short order, the correct servo track can be reacquired by comparing the distance count with the stored or calculated value. In other embodiments using a centertapped servo head, the upper and lower portion of the chevron can be determined by suitable time base comparison, e.g., comparing the pulse count difference between the two halves of the servo head.

Figure 10:
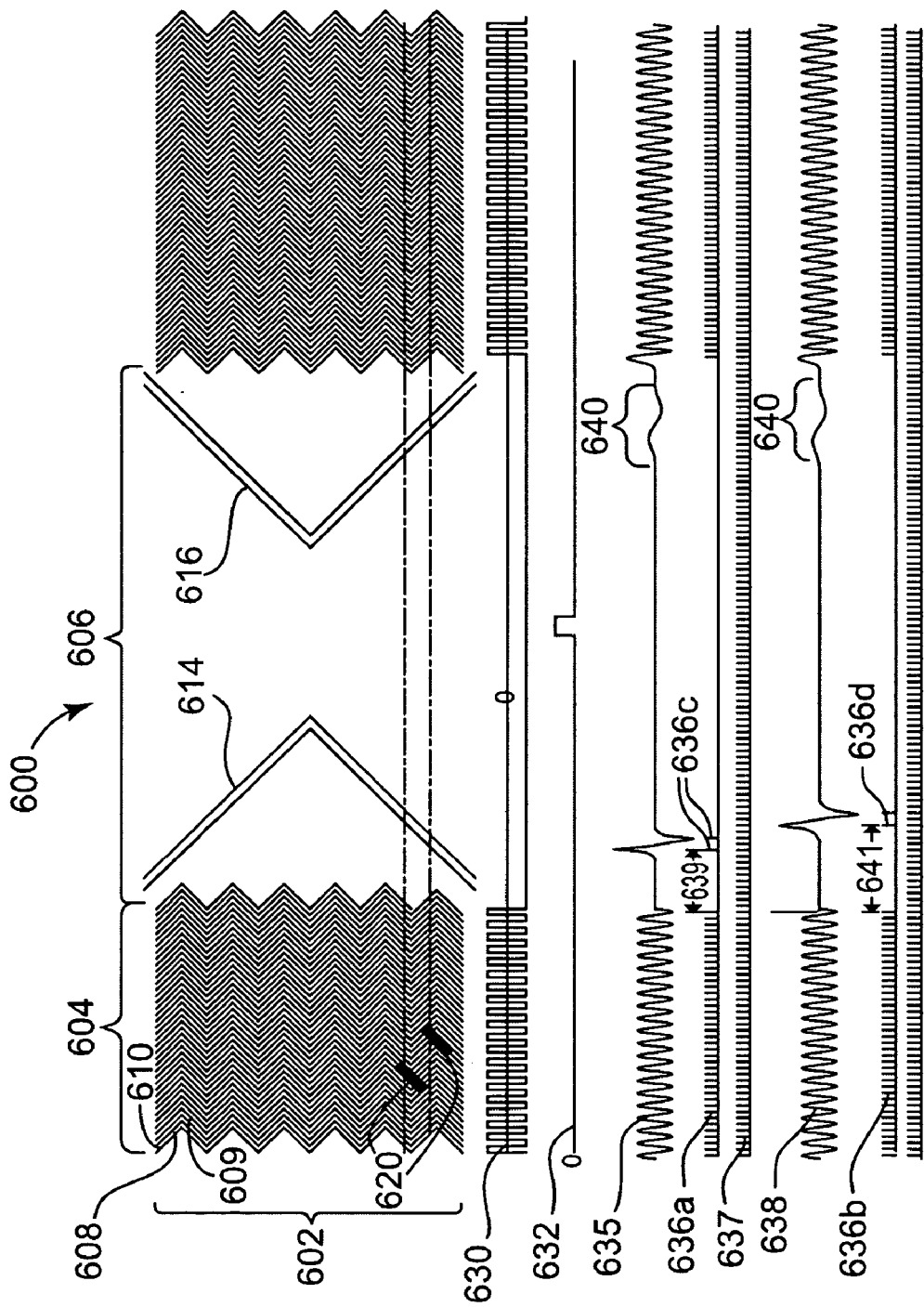
FIG. 10 schematically shows a servo band of the present invention having track guiding and track ID capabilities and incorporating a hybrid encoding scheme including time based servo transitions and amplitude based servo transitions.

FIG. 10 illustrates a representative portion of a servo system 600 whose servo band 602 incorporates track following servo sectors 604 and a representative ID sector 606. The track following servo sectors 604 incorporate servo tracks 608 and 609 in which servo tracks 608 contain servo transitions 610 written at alternating azimuth angles relative to tracks 609. Across the width of the servo band 602, the servo transitions form a zigzag pattern. These are generally written by pulsing a servo writing head (not shown) having a zigzag writing gap at an appropriate frequency as the head moves down the length of the corresponding servo band. ID sector 606 includes opposed "chevron" transitions 614 and 616. The chevron transitions 614 and 616 preferably are written with a separate, independent servo writing gap with respect to the writing gap used to write the azimuth servo transitions 610.

Figure 15:
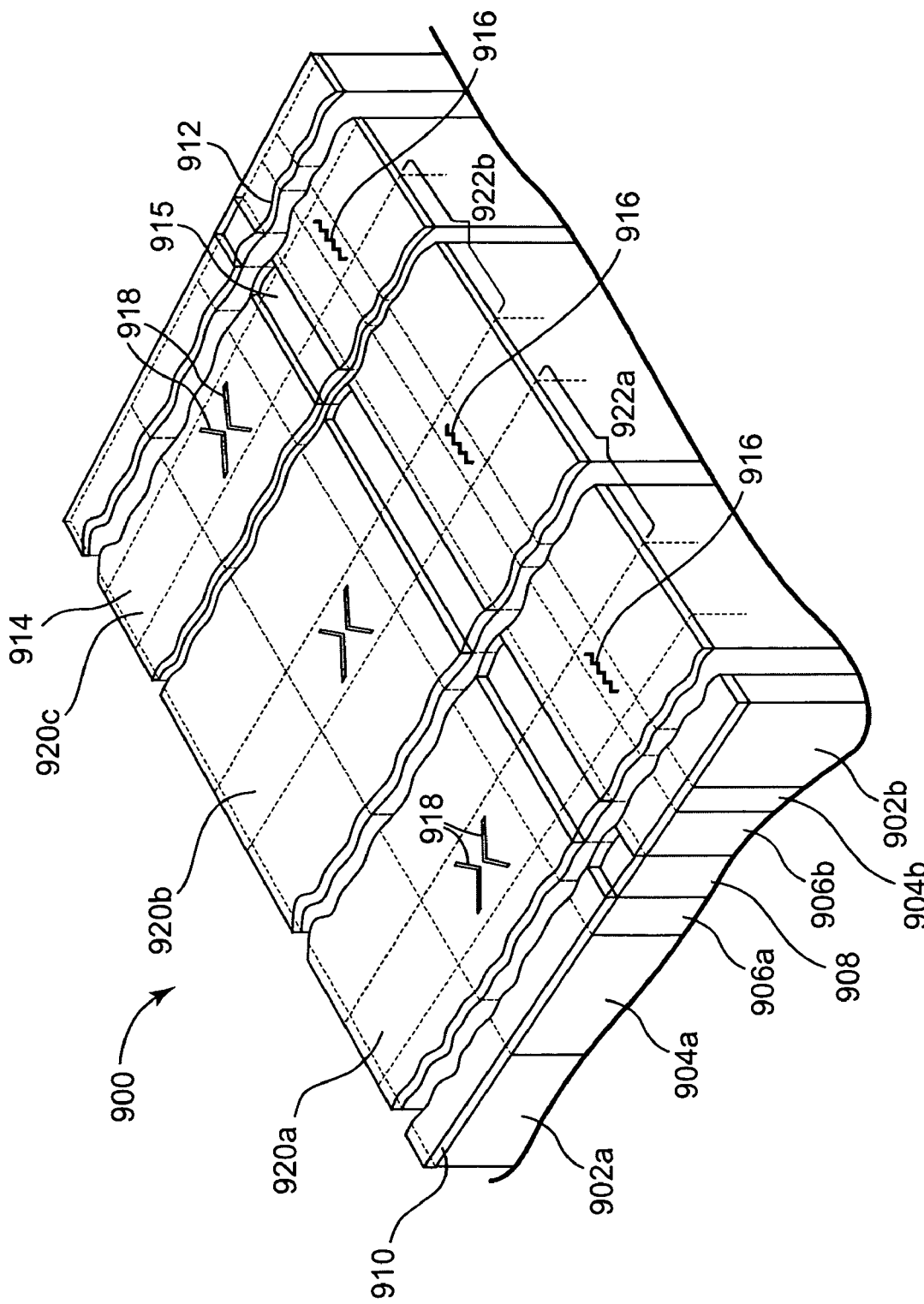
FIG. 15 schematically shows a perspective view of a portion of a servo writer head containing an array of zigzag writing gaps and opposed chevron writing gaps, wherein the head can be used to create the servo band shown in FIG. 10.

The manner of writing the zigzag servo transitions 608 and 609 and the chevron features 614 and 616 is shown by pulse plots 630 and 632. Plot 630 shows the pulse of a servo writer head (not shown) having a zigzag writing gap used to write the zigzag transitions 608 and 609 as a function of position along the length of servo band 602. Note that the pulses corresponding to the transitions 608 and 609 do not occur within ID sector 606, indicating that the zigzag transitions are not written in that region. Note that such a servo writer head having a writing gap corresponding to the zigzag pattern of the transitions 608 and 609 across the width of the servo band 602 is pulsed at a generally constant frequency to create these features in the servo sectors 602. Plot 632 shows the pulse of a servo writer head (not shown) having chevron style writing gaps used to write the chevron patterns 614 and 616 as a function of position along the length of servo band 602. Note that such a servo writer head having writing gaps corresponding to the opposed chevron pattern is pulsed once at a desired time to create the features in ID sector 606. FIG. 15 shows a servo writing head having writing gaps capable of writing both zigzag transitions 608 and 609 as well as chevron pattern 614 and 616.

A servo reading head 620 includes servo sensor 622. Head 620 is shown in two positions. Specifically, head 620 is shown in the track 0 and track 2 positions, respectively, to illustrate the different time count provided by the time-base encoding features as between "adjacent" tracks of the same azimuth angle. In FIG. 10, the tracks 608 may be consecutively denoted with even numbers as tracks 0, 2, etc., while the tracks 609 written at the opposite 10 azimuth angle may be odd-numbered, e.g., 1, 3, etc. Note that the head 620 is generally aligned with the azimuth angle of the servo tracks 0 and 2 being respectively read in the two positions. Note, too, how the azimuth angles of the legs 624 of the transitions 614 and 616 match the azimuth angles of one alternating set of the servo tracks 608, while the azimuth angles of the legs 626 of the transitions 614 and 616 match the azimuth angles of the other alternating set of the servo tracks 609.

Transitions 614 and 616 advantageously function as time-base encoding features that provide track ID information. Specifically, the time-base servo information read from these features allows system 600 to actively identify which of the servo tracks 608 and 609 is being read. Typically, numerous track and group identity sectors are embedded down the length of the tape in each servo band so that the track identity may be quasi-continuously updated. Track identity is achieved by tracking the PES with a narrow band phase locked loop with a long time constant. This provides counting pulses from the last transition of the track following PES signal to the first transition of the chevron. During servo writing of the tape, the pulses are counted by a servo verify head and stored at the beginning of the tape. The count number then identifies the track. The distance for each track can be measured and recorded. Alternatively, using the azimuth angle and the servo track pitch, such distance can be calculated inasmuch as the locations of the track/group identity transitions preferably have been established for all tracks and servo bands by precision photolithography (see below for the discussion of how the writing gaps corresponding to the servo and ID sectors are positioned and formed in the servowriter head shown in FIG. 15).

The track identification functionality is further shown by plots 635, 636, 637, 638, and 639 in FIG. 10. Each of these plots shows servo information derived from servo band 602 as a function of position along the length of servo band 602. Plot 635 shows the servo signal derived by servo reading head 620 as head 620 moves along track 0. Plot 636 shows the clock ticks corresponding to clock periods in which a servo transition is detected along track 0. Note that clock ticks 636a and 636b represent clock ticks corresponding to the azimuth servo transitions in servo sectors 604, while the clock ticks 636c represent clock ticks corresponding to the chevron style transitions in ID sector 606. Note timing gap 639 between clock ticks 636a and 636c. Plot 637 shows the PLO clock pulses. Comparing the PLO clock pulses of plot 637 to the detected pulses in plot 636, it can be seen that there are, in this example, nine PLO clock pulses associated with timing gap 639. Consequently, a timing gap characterized by nine PLO clock pulses identifies track 0. Note that it is not necessary to measure the total length of the gap (i.e., the length of the ID sector 606) to obtain track ID information.

Plots 638 and 639 shows similar information obtained with respect to track 2. In this case, the PLO pulse count associated with the timing gap 641 for track 2 was 13 pulses, meaning that such a missing pulse count indicates that track 2 is being read. Hence, the timing gap offset between track 0 and track 2 is four (4) pulses. Subsequent alternating tracks would increase by a suitable count, e.g., a count of 4, for each increasing track number. With this illustrative four bit or more difference, the count could vary by ±1 without loss of track identification. Of course, the number of missing pulses used to identify such tracks need not be 9 or 13, but rather the number of missing pulses to be used to identify a track may be quasi-arbitrary. Preferably, though, the count is consistent across all the servo bands of the medium being used for reading, writing, and erasing.

Figure 11:
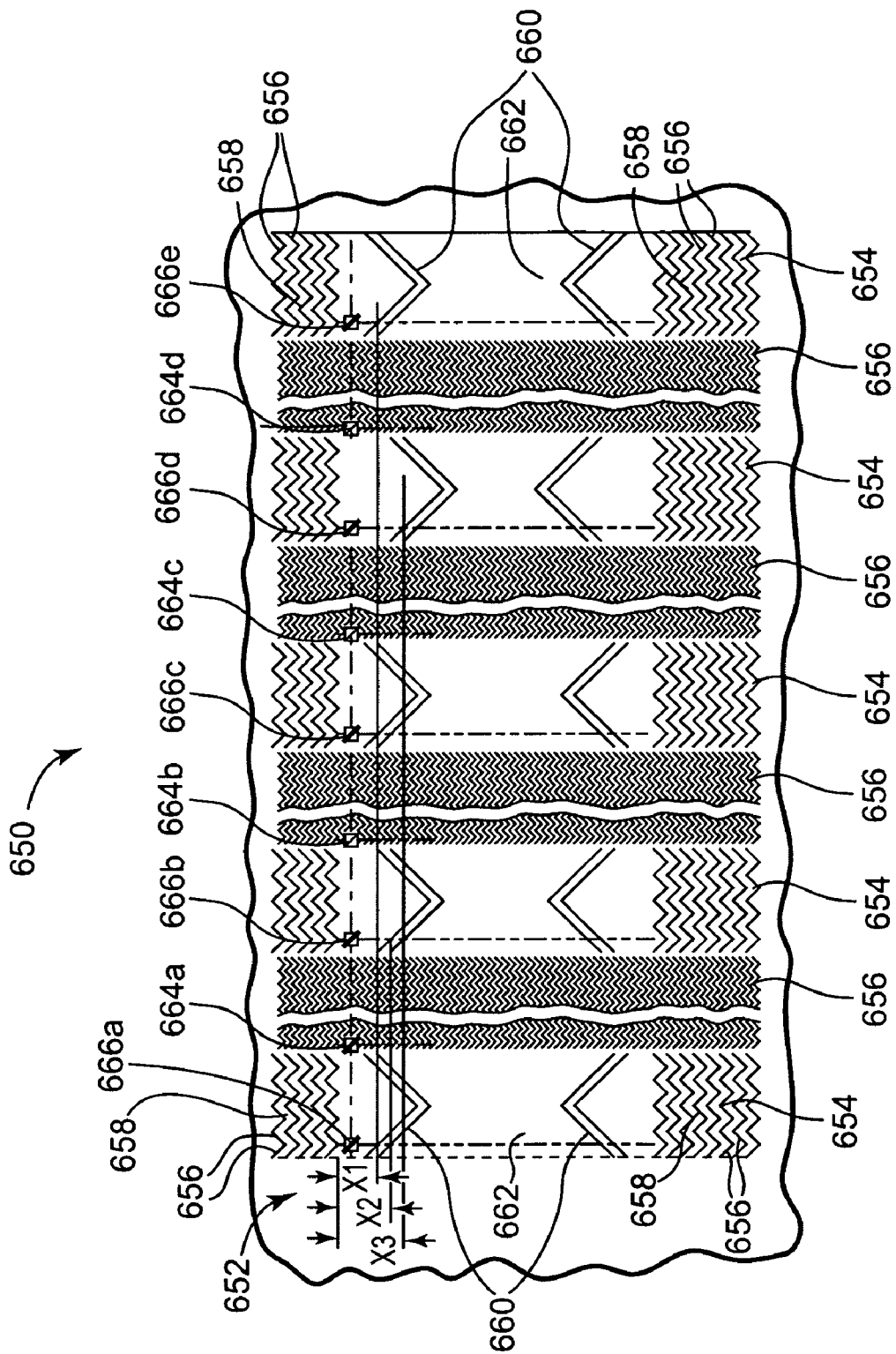
FIG. 11 schematically shows a data storage medium of the present invention comprising servo bands incorporating a hybrid encoding scheme including time based servo transitions and amplitude based servo transitions such that the servo band has track guiding and track/group ID capabilities.

In some modes of practice, it is further desirable that a servo system provides not just track identification but also group identification. FIG. 11 shows one embodiment of a data recording system 650 the invention that provides both track and group identification. System 650 includes a tape 652 incorporating a plurality of servo bands 654 and data bands 656 arranged in groups. Each servo band 654 includes azimuth servo features 656 in servo sectors 658 for on track guidance as well as opposed chevron features 660 in ID sectors 662 for track and group identification. Data sensors 664a, 664b, 664c, and 664d engage the data bands 656, while servo sensors 666a, 666b, 666c, 666d, and 666e engage the servo bands 654. Group identification is provided in a manner similar to that used in LTO drives, i.e., shifting the position of the chevron transition features 660 in ID sectors 662 so that timing between the left and right servo sensors would be unique. This is denoted in FIG. 11 by the different distances $x_1$, $x_2$, and $x_3$.

Figure 12:
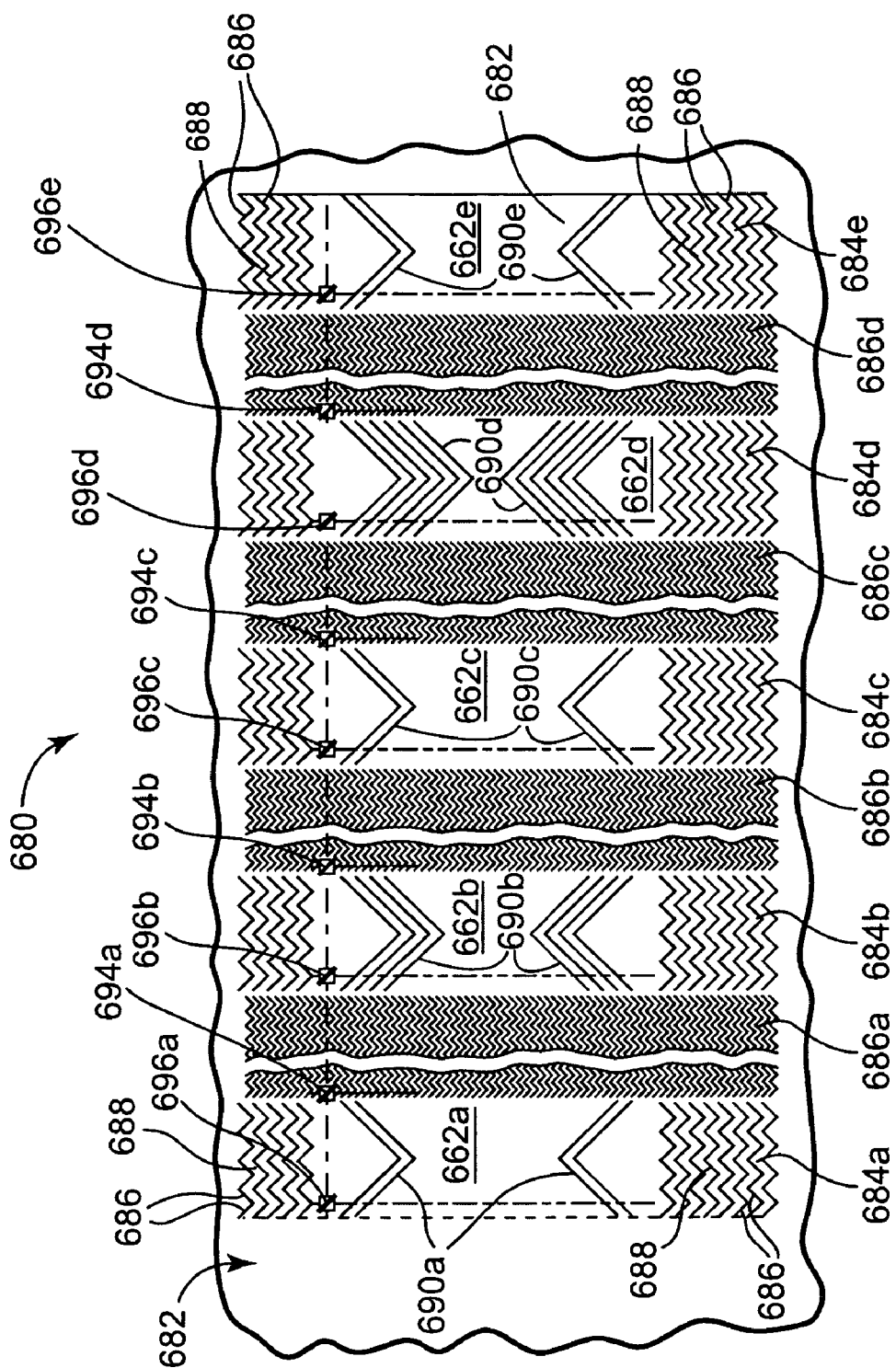
FIG. 12 schematically shows another embodiment of a data storage medium of the present invention comprising servo bands incorporating a hybrid encoding scheme including time based servo transitions and amplitude based servo transitions such that the servo band has track guiding and track/group ID capabilities.

FIG. 12 shows another embodiment of a data recording system 680 of the invention that provides both track and group identification even with loss of position so that an adjacent track would not be confused, for example, with trk 0 or 1 in the wrong group. System 680 includes a tape 682 incorporating a plurality of servo bands 684a, 684b, 684c, 684d, and 684e as well as data bands 686a, 686b, 686c, and 686d arranged in groups 0, 1, 2, and 3. Each servo band 684a, 684b, 684d, and 684e includes respective azimuth servo features 686 in respective servo sectors 688 for on track guidance as well as respective opposed chevron features 690a, 690b, 690c, 690d, and 690e in ID sectors 692a, 692b, 692c, 692d, and 692e for track and group identification. Data sensors 694a, 694b, 694c, and 694d engage the data bands 686a, 686b, 686c, and 686d, while servo sensors 696a, 696b, 696c, 696d, and 696e engage the servo bands 684a, 684b, 684c, 684d, and 684e.

Group identification is offered by the differing chevron patterns associated with each group. Thus, groups 1 and 2 in FIG. 12 differ from group 0 in that servo bands 684b and 684d include successively additional chevron features. Advantageously, this approach allows the first time base transition in the ID sectors 692a, 692b, 692c, 692d, and 692e to remain the same distance from the beginning of the sector, preserving the same trk 0, and subsequent tracks, reference distance. The disadvantage of this approach is that a servo writing head with many write gaps would be required to create the time base encoding features.

FIGS. 11 and 12 differentiate ID sectors from one another via staggered transitions and/or different numbers of transitions. Other ways of differentiating ID sectors may also be used in the practice of the present invention. As another illustrative approach, the spacing among the time base features can be varied. This may be accomplished by changing the pulse frequency among the ID sectors as desired for suitable differentiation. As another approach, the time base features can vary in thickness. These features can be made by using writing gaps of varying dimensions. These alternative approaches are shown in FIGS. 13 and 14, respectively.

Figure 13:
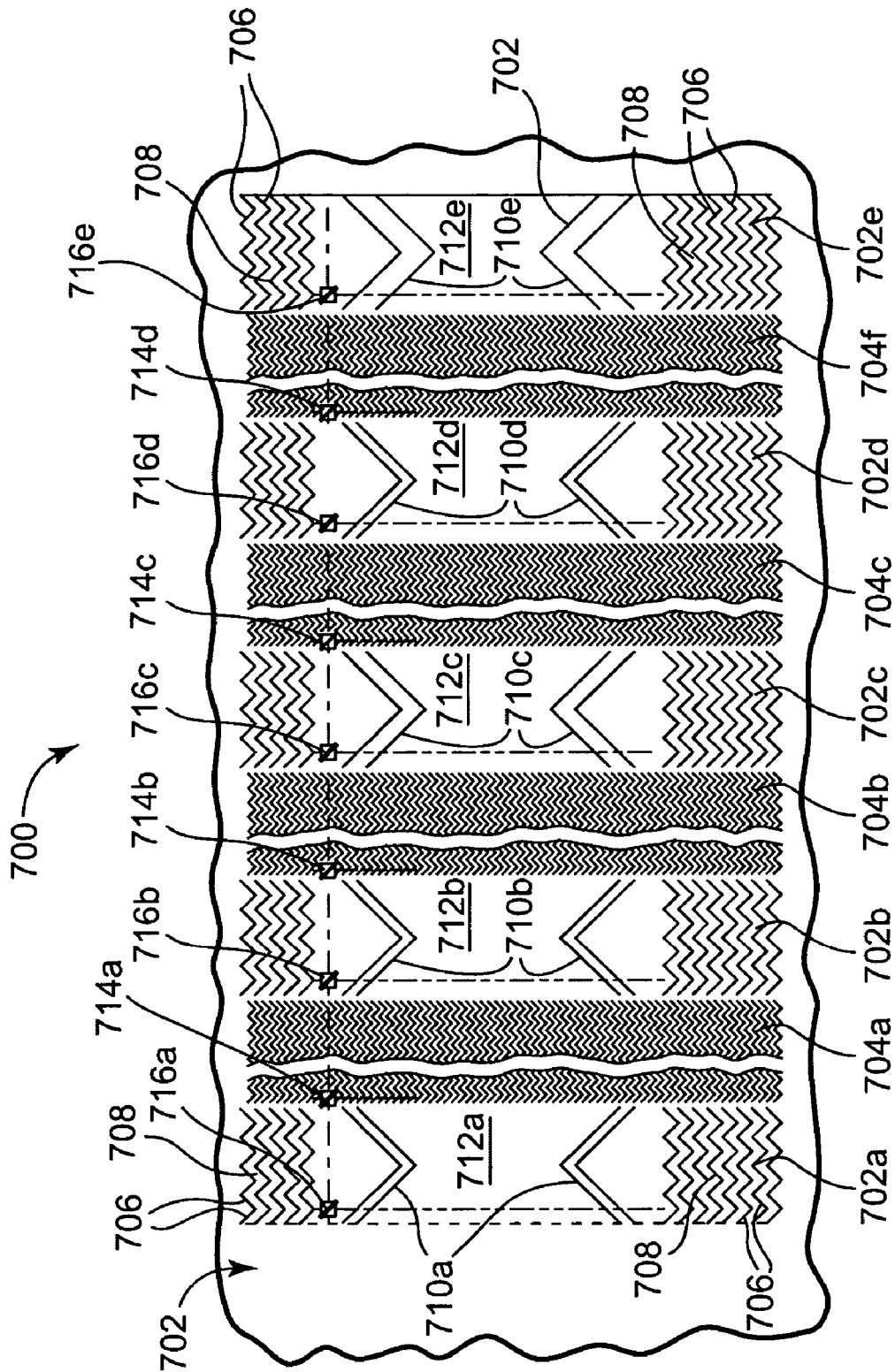
FIG. 13 schematically shows a data storage medium of the present invention comprising servo bands incorporating a hybrid encoding scheme including time based servo transitions and amplitude based servo transitions such that the servo band has track guiding and track/group ID capabilities.
Figure 14:
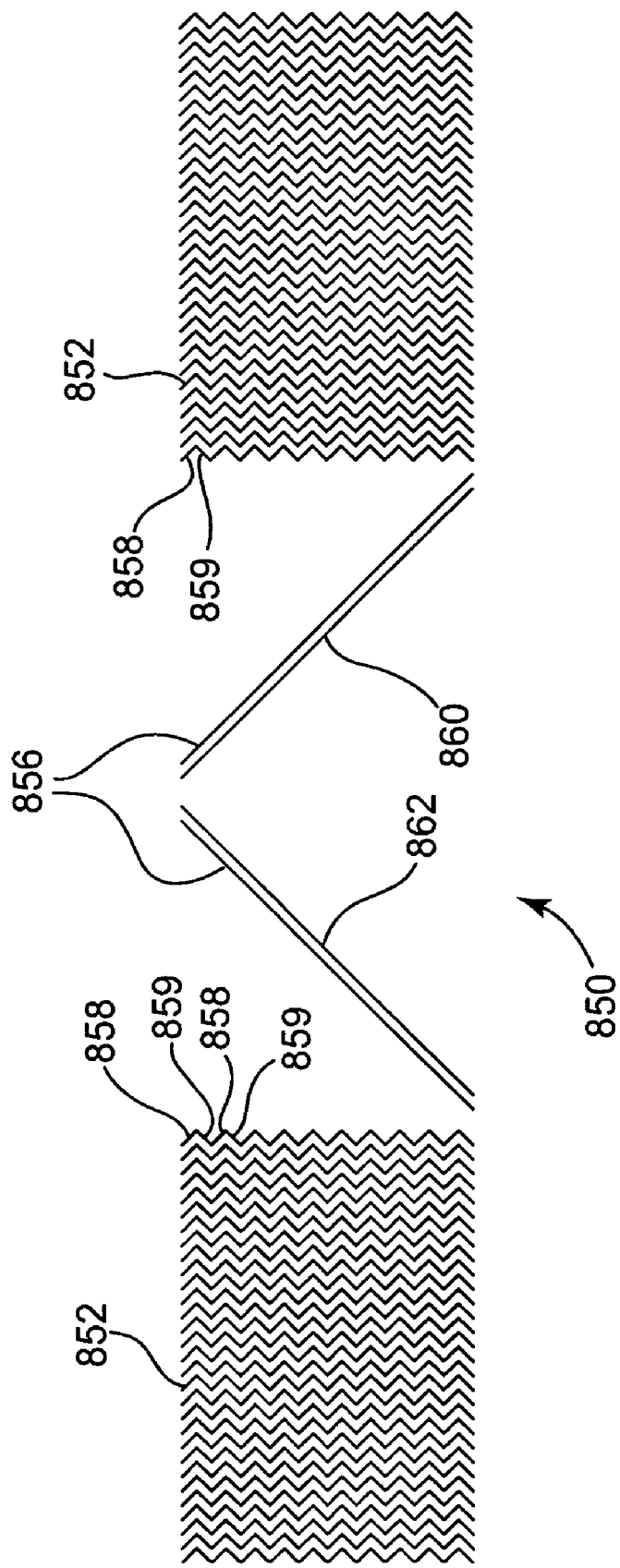
FIG. 14 schematically shows a servo band of the present invention having track guiding and track ID capabilities and incorporating a hybrid encoding scheme including time based servo transitions and amplitude based servo transitions.

FIG. 13 shows one embodiment of a data recording system 700 of the invention that incorporates two or more encoding schemes for servo functionality, e.g., at least one or more amplitude-based features for on track guidance and one or more time-based features for track and group identification. System 700 includes a tape 702 incorporating a plurality of servo bands 702a, 702b, 702c, 702d, and 702e and data bands 704 arranged in groups 0, 1 and 2. Each servo band 702a, 702b, 702c, 702d, and 702e includes azimuth servo features 706 in servo sectors 708 for on track guidance and further includes opposed chevron features 710a, 710b, 710c, 710d, and 710e in ID sectors 712a, 712b, 712c, 712d, and 712e for track and group identification. Data sensors 714a, 714b, 714c, and 714d engage the data bands 704, while servo sensors 716a, 716b, 716c, and 716d engage the servo bands 702a, 702b, 702c, 702d, and 702e. Group differentiation among the servo bands 702a, 702b, 702c, 702d, and 702e is achieved by the variation in differential spacing among chevron features 710a, 710b, 710c, 710d, and 710e in groups 0, 1, and 2. This variation may be achieved in a variety of ways such as by adjusting the length of the track ID pulse 632 in FIG. 10, or by varying the width of the track ID writing gaps, or the like.

The above figures illustrate time-based servo transitions provided as opposed chevrons. Of course, other styles of time-based servo transitions could also be used in track and group ID sectors. Representative examples of such other time-based transition features include any time-based features known in the art, including, for example, diamond-shaped transitions, vee, inverted vee features, combinations of these, or the like. For example, FIG. 14 illustrates a servo band 850 comprising servo sectors 852 and an ID sector 854. The time-based transitions in ID sector 854 are in the form of an inverted vee 856. The servo sectors incorporate azimuth style servo transitions 858 and 859. Note how one leg 860 of the inverted vee 856 is parallel to servo transitions 858, while other leg 862 is generally parallel to servo transitions 859.

To summarize, group identification system preferably is achieved by varying some characteristic of the time base features among servo bands in different groups. This is accomplished by providing differences in the transition characteristics that are unique among any two groups. The preferred approaches include the following strategies. First, one approach varies the distance of the track/group identity transitions from the beginning or end of the track/group identification sector. Distances to track 0 and subsequent tracks will vary depending on the group. Another approach varies the number of track/group identity transitions. Still another approach varies the down track space between the track/group identity transitions. This is the most preferred method because it requires the least number of gaps, and more than one sector for each data group can be used to independently verify track identity.

Servo bands incorporating one or more principles of the present invention may be written using novel servo writer heads comprising writing gap(s) corresponding to the servo feature(s) to be written. For example, a servo head useful in the practice of the present invention may include a zigzag writing gap to write azimuthal transitions, writing gaps constituting opposed chevrons to write opposed chevron transitions into ID sectors, combinations of these, and the like. Novel heads with these write gap features may be manufactured using techniques described in U.S. Pat. Nos. 6,496,328; 6,269,533; 6,678,116; 6,894,869; and 6,989,960, all of which are incorporated by reference herein in their entireties. Please also refer to U.S. Pat. No. 6,947,247, incorporated herein by reference in its entirety.

A preferred servowriter head structure contains an aligned sandwich of independent writers for the track following servo and the track/group identity patterns alternating between layers for the servo bands and a non-magnetic layer approximately encompassing the width of the group of data bands forming data groups incorporating shared interior servo bands. The substructure includes two independent writers whose gaps are wide and long enough to contain the track following servo pattern and the track/group identification patterns, respectively. These two writers are bonded together or unitarily formed, along with a non-magnetic spacer between them for isolation, and lapped to form a smooth continuous surface. A high moment, low coercivity, mechanically hard magnetic thinfilm is then deposited on the lapped substructure. This film is etched with the appropriate pattern to form the track following and track/group identification gaps for recording on the tape. The film may be broken (etched) above the non-magnetic spacer to enhance isolation between the track following writing and track/group identification writing.

A representative embodiment of a servo writer head 900 according to these criteria is shown in FIG. 15. Head 900 incorporates writing gaps to create both azimuthal and track ID transitions on a data storage medium as is shown, for example, in FIGS. 11-15. Head 900 has a composite substructure formed of various layers. As such, head 900 generally includes sub-pole members 902a and 902b, gap layers 904a and 904b, pole members 906a and 906b, and a nonmagnetic sub-gap layer 908 interposed between substrate layers 906a and 906b. A magnetic thin film layer 910 is deposited over the structure formed by sub-pole members 902a and 902b, sub-gap layers 904a and 904b, sub-pole members 906a and 906b, and isolation layer 908. Preferably, magnetic thin film layer 910 is a material, such as FeAlN, that has high moment and mechanically hard, low coercivity characteristics. The composite structure and gap features of head 900 provide at least two independent recording head portions. These include servo pattern writer portion 912 and track ID/group ID writer portion 914. Each of portions 912 and 914 as a practical matter constitutes an individual recording element. The servo pattern writer portion 912 and the track ID/group ID writer portion 914 are built on a common wide gap substructure with two independently energized gaps. At least one leg of each such recording element would have a wire coil (not shown) wound around it or a thinfilm coil (not shown) deposited in each of the sub-gaps 904a and 904b, adjacent to the pole members 902a and 902b, respectively. for energizing the corresponding element function. A thinfilm coil is more preferred for high track density structures with many groups.

Optionally, and as shown, magnetic thin film layer 910 is shown with a break 915 over the nonmagnetic sub-gap layer 908. In practical effect, this helps reduce cross-talk between the servo pattern writing portion 912 and the track ID/group ID writer portion 914 since sometimes both portions could be energized. The width of the head 900 preferably would encompass the desired tape width and there would be one identity write gap for each servo band. As illustrated, magnetic thin film layer 910 includes servo pattern writing gaps 916 and track and group ID writing gaps 918 positioned in a manner effective to write the desired number of servo bands at the desired spacing across the width of the tape during servo writing operations. The servo writing gaps 916 and the track and group ID writing gaps 918 preferably are simultaneously etched in the film layer 910 to provide very accurately positioned gaps for recording on the media.

For purposes of illustration, enough writing gaps 916 and 918 are provided so as to provide three servo bands 920a, 920b, and 920c and two data bands 922a and 922b. However, in actual practice a greater or lesser number of servo bands may be used as desired. The intervening portions of head 900 corresponding to data bands 922a and 922b are not shown for purposes of clarity.

Head 900 may be fabricated in a variety of ways. According to one approach, head 900 may be mechanically assembled from separate structures. For instance, two servo writer assemblies may be provided, wherein each includes first and second sub-pole members, a sub-gap member interposed between the two poles, a magnetically permeable layer formed over the sub-pole members and sub gap members, a servo writing gap pattern formed in a portion of the magnetically permeable layer overlying the associated sub-gap member, and a coil energizingly coupled to the assembly in a manner such that a magnetic flux pattern corresponding to the servo writing gap pattern can be written in a data storage medium. The two assemblies may then be adhered or otherwise fixed together so that the two gap patterns 916 and 918 are in a predetermined spatial relationship with each other on the resultant data storage media engaging surface of the resultant compound head 900. The two assemblies preferably may function independently of each other.

Even though head 900 can be fabricated as two independent heads, head 900 preferably is fabricated as a unitary structure. Thus, although it is possible to assemble separate structures for the servo pattern writer function and the track/group ID writer function, it is more preferred that the write substructures be first formed and lapped in unitary fashion before the magnetic layer 910 is formed so as to incorporate the first and second writing gap patterns 916 and 918. Such a patterned magnetic layer 910 may be formed in a variety of ways. According to one approach, the layer 910 is deposited and then the writing gap patterns 916 and 918 may be photo lithographically patterned, preferably at one time, for more precise alignment and positioning of the gaps 916 and 918 with respect to each other. Generally, such etching may be accomplished by forming a patterned mask onto the magnetic layer 910, wherein the patterned mask includes gap features corresponding to writing gap patterns 916 and 918 and/or feature(s) serving as a reference from which patterns 916 and 918 can be accurately formed. The mask may then be used to help form the writing gap patterns 916 and 918 using a suitable etching technique such as dry etching techniques, wet etching techniques, focused ion beam techniques, combinations of these, or the like. Focused ion beam techniques for fabricating magnetic recording heads are described in U.S. Pat. Nos. 6,269,533 and 6,678,116, both of which are incorporated herein in their entireties.

Generally, if two separate head structures are first made and then assembled to form the compound head structure, the resultant alignment of the two kinds of writing gaps 916 and 918 is limited by mechanical precision, which may be on the order of a few micrometers. In contrast, etching the writing gaps on a unitary structure incorporating both head portions allows the gaps to be positioned with photolithographic accuracy, which can be a few tenths of a micrometer or better. Forming the gaps together using photolithographic techniques recognizes that accurate placement of the writing gap features on the head is important but less critical than the relative positioning with respect to each other. This unitary approach allows for more precise alignment of the writing gaps 916 and 918 with respect to each other in each servo band. Track following recording and track/group identity recording may occur in the same operation because of the accurate spatial lag of the track/group identity recorder gap relative to the track following recorder gap.

Figure 16:
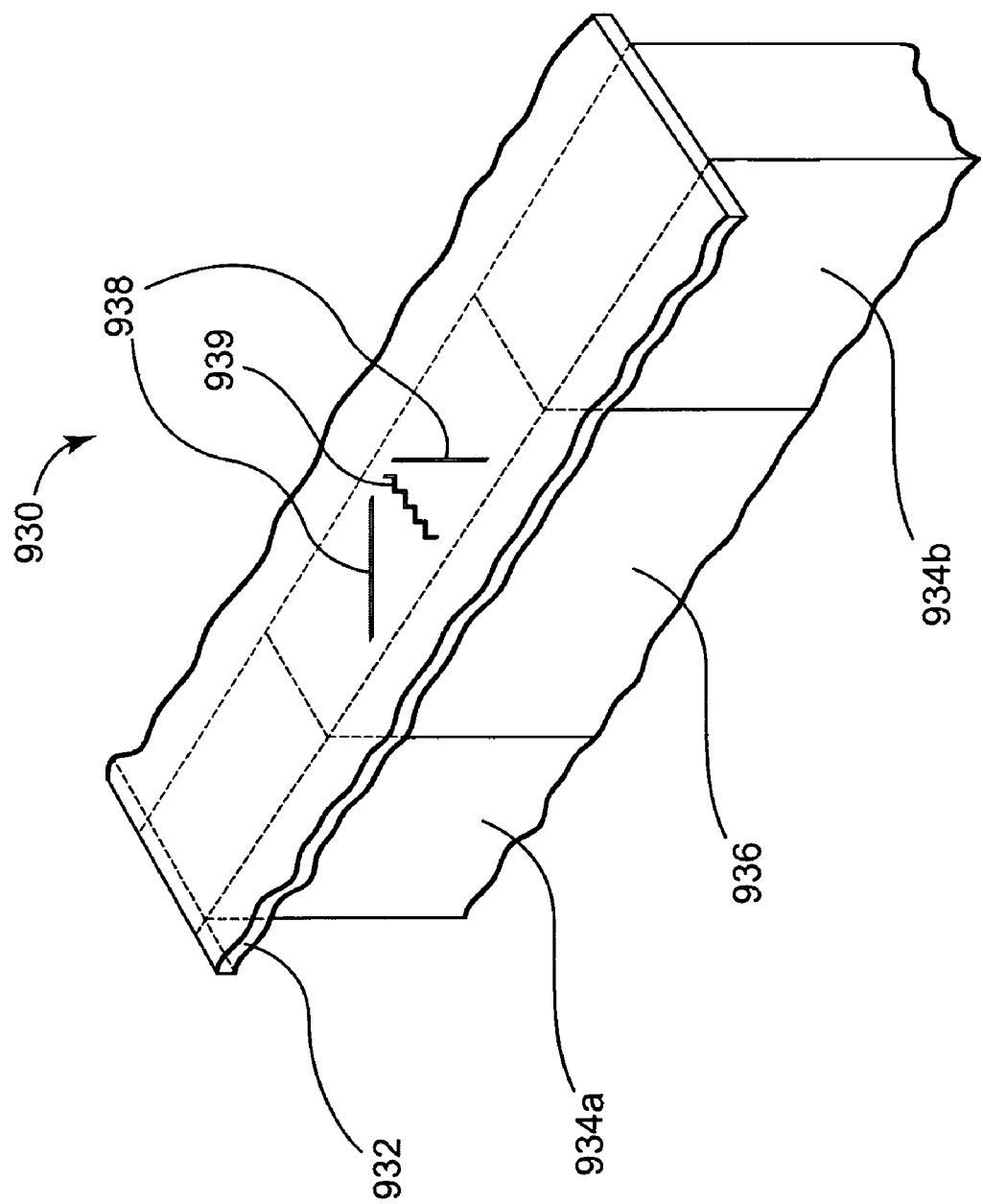
FIG. 16 schematically shows a perspective view of a portion of an alternative embodiment of a servo writer head having writing gaps that provide servo bands with amplitude and time based features, wherein portions of the head in between the servo bands are removed for purposes of clarity.

Servo bands are described above utilizing a track following sequence of zigzag transitions in servo sectors interspersed with track identification sectors or blocks. The track identification sectors are periodically embedded within the servo band as comprising a uniform DC magnetization in the media with a pattern (such as one or more chevrons) provided with opposite magnetization. FIG. 16 above illustrates a servo write head to provide such a pattern by pulsations at appropriate timing to create such patterns at desired locations along the servo band.

A methodology of using the track identification sectors with such a pattern for track/group identification purposes is based upon the time period between a reading of a last zigzag field according to the tape direction and a reading of the time-based transition or pattern field (based upon the pattern portion of similar cant to the zigzag portions read for a tape direction). That is, the spatial and thus temporal distance between the appropriate last zigzag transition of the track following sequence of a block and the field portion of the pattern can be used to identify the track. That spatial or temporal information can be stored at the beginning of the tape as the track identification information.

However, in order to periodically provide such track identification sectors, precise control is needed to make sure that (depending on tape speed and consistency thereof), during the writing process, the pattern-creating, current pulses are also timed to the last creation of a zigzag for track following. As described above, the patterns are created by, essentially, an independent servo write head (see FIG. 16) where chevrons, for example, are created by one portion of the servo writer head while the zigzags are created by a different portion of the servo writer head. Although the servo writer head is shown and described as preferably being of an integrated design, the ceramic layer functionally creates independent head portions with each portion having its own gap (sometimes called sub-gap) covered by a thin film layer with the appropriate pattern (zigzag or chevron) provided as the actual write gaps.

As an alternative to the above described track identification sectors, it is contemplated to incorporate one or more zigzag transitions within an ID sector, and preferably between ID sector transitions (magnetic field pattern portions) such as those that would be oppositely canted with respect to one another. As an example, FIG. 16 schematically illustrates a thin film servo write head 930 as comprising sub-pole members 934a and 934b, sub-gap member 936, and magnetically permeable layer 932 overlying members 934a, 934b, and 932. Thin film servo write head 930 includes, as an ID sector gap writing pattern, a single zigzag gap 939 incorporated between opposite cants 938 that form a single inverted vee. The legs of zigzag 939 are alternatingly parallel with the opposite cants 938, respectively. For any given servo band, such an identification scheme can be developed including any of the variations described above regarding other embodiments. Only one gap pattern is shown on head 930, but in actual practice head 930 is likely to include multiple patterns 950 in a plurality of channels. Pattern 950 may also be used in a compound head such as head 900 of FIG. 15 in place of or in addition to pattern 918 of FIG. 15.

As such, track identification can be accomplished based upon the design and writing of such a combination pattern including zigzags and a track identification pattern. Data group identification can also be achieved with this concept in a number of ways. For example, the whole gap pattern can be written any number of times within a track identification sector and/or the number of or frequency of track identification sectors can be varied. Alternatively, the location of the zigzag 939 relative to the oppositely canted transition portions 938 can be varied to identify a data group. As yet another possibility, this concept can be combined with the concept described above to not only incorporate a zigzag pattern into the track identification block pattern but also to utilize the spacing and thus temporal aspect between a last zigzag pattern of a track following sequence and a transition of the identification block pattern. That is, both techniques can be utilized together for track, group, or any other aspect identification.

An alternative to providing any number of track following sequence blocks with periodic track identification blocks, with or without further data group information or encoding, is to write the pattern containing both the identification transitions and the servo transitions in a continuous and contiguous sequence along the tape as the servo band. A significant advantage of this approach would be the elimination of a portion of a servo writer head, as described above and shown in FIG. 16, because only one of the portions would be needed to create repeated patterns based upon control of current pulsing. There would be no need to selectively pulse one pattern from another.

Figure 17:
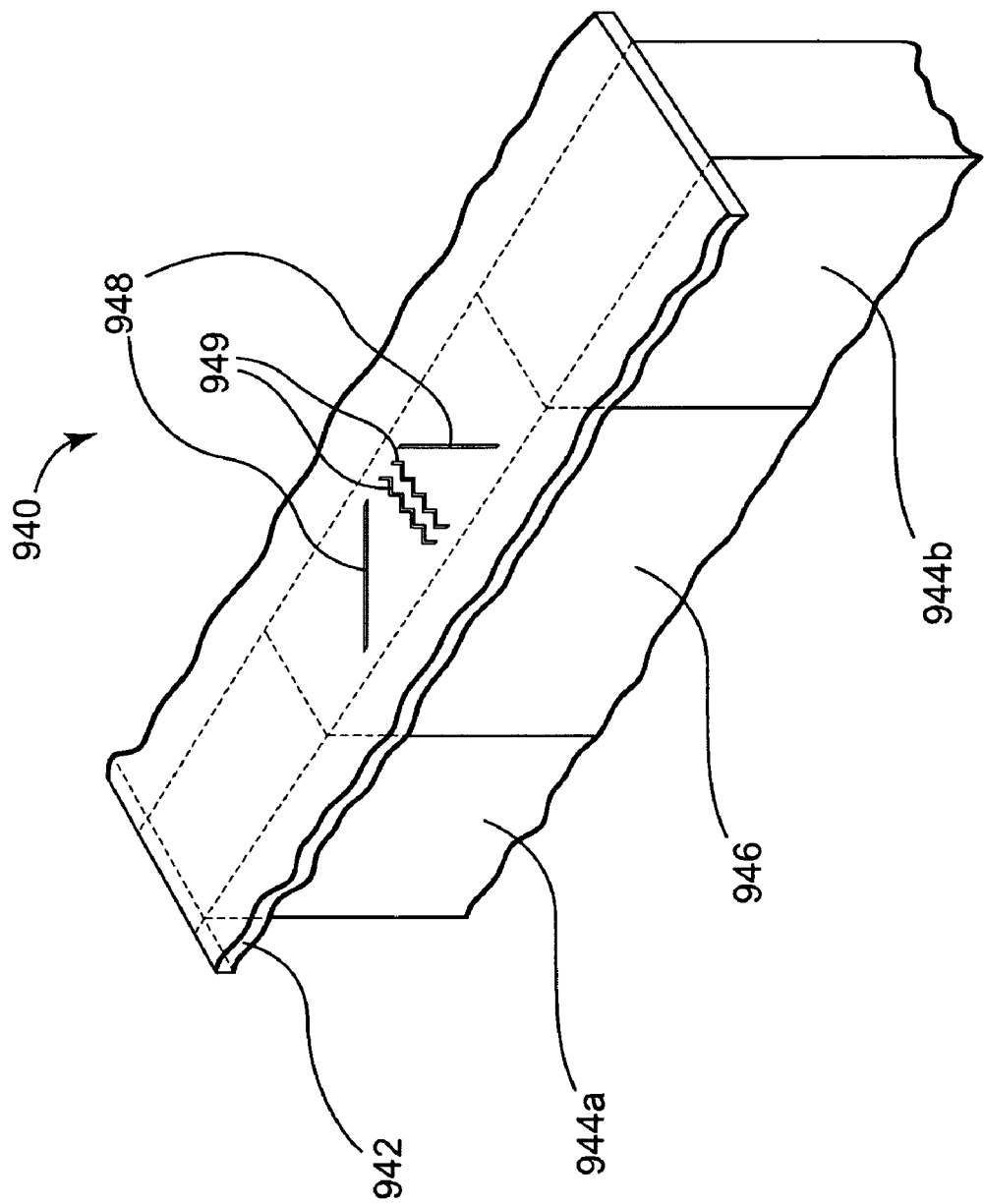
FIG. 17 schematically shows a perspective view of a portion of an alternative embodiment of a servo writer head having writing gaps that provide servo bands with amplitude and time based features, wherein portions of the head in between the servo bands are removed for purposes of clarity.

FIG. 17 illustrates another embodiment of a thin film servo write head 940 comprising sub-pole members 944a and 944b, sub-gap member 946, and magnetically permeable layer 942 overlying members 944a, 944b, and 946. Thin film servo write head 940 includes a servo writing gap pattern that includes a plurality, in this example two, zigzag patterns 949 centrally located between sides 948 in the form of a "vee" or "inverted vee". As shown, preferably there are like numbers of zigzag and identification patterns, but such is not necessary. For instance, it may be preferable to include more zigzag patterns 949 than sides 948 to enhance tracking. Only one gap pattern is shown on head 940, but in actual practice head 940 is likely to include multiple patterns in a plurality of channels. The pattern may also be used in a compound head such as head 900 of FIG. 15 in place of or in addition to pattern 918 of FIG. 15.

FIG. 17 shows how any number of complex patterns (each having zigzag patterns with identification patterns) can be applied with a single servo write head having but a single subgap. Such combination patterns can be similar or different with respect to one another as desired and in accordance with the concepts described and suggested above. By creating a servo band comprising a repeated pattern of a combination of track identification patterns and any number of zigzag patterns, both the track following aspect can be accomplished (by following the zigzag patterns), while track identification and possibly group identification information is encoded along the entire servo track length. It is contemplated that any number of zigzag patterns can be combined with any number of identification patterns and that the zigzags can be incorporated within a central portion of the identification pattern or to either side, or a combination of both.

Figure 18:
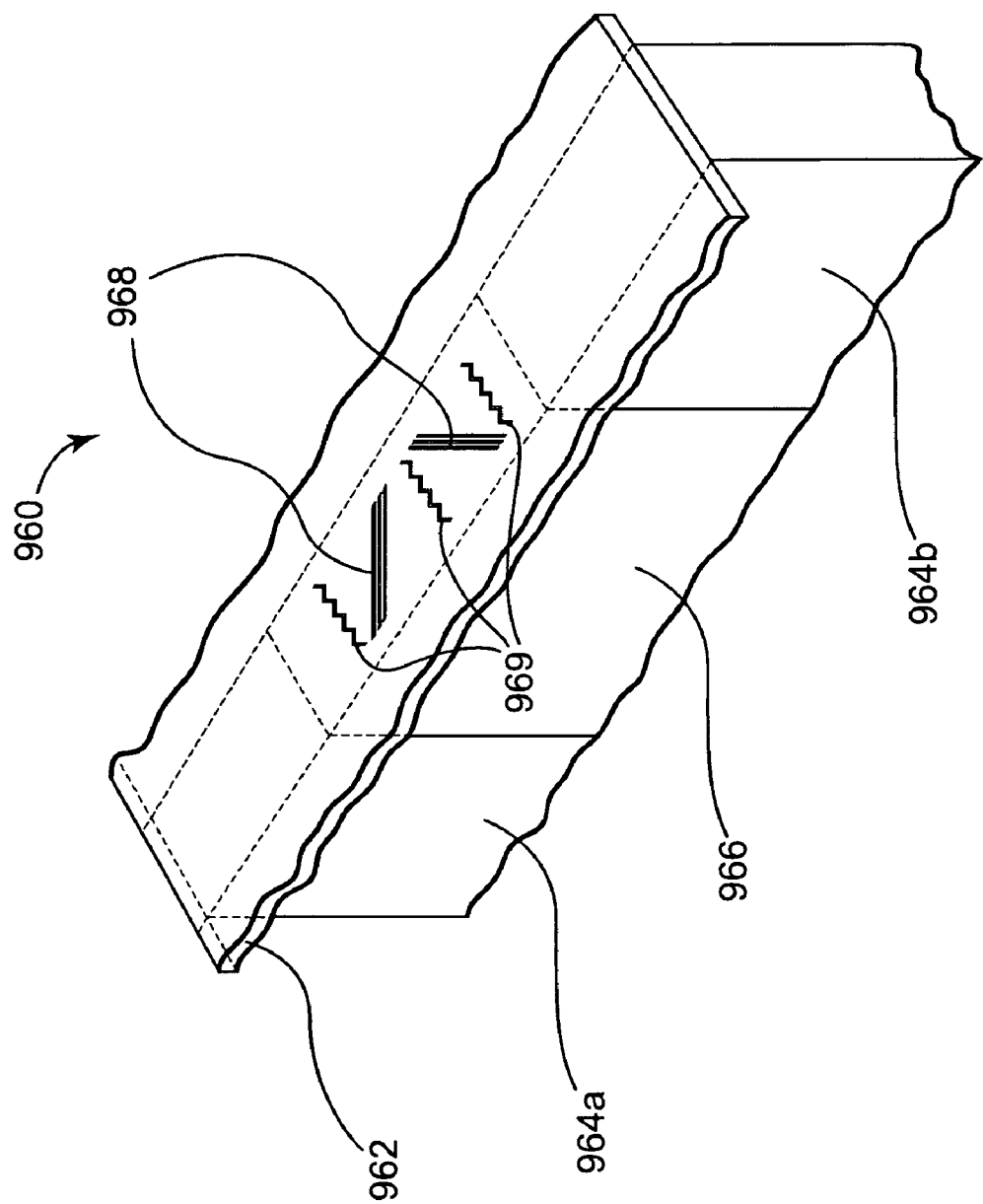
FIG. 18 schematically shows a perspective view of a portion of an alternative embodiment of a servo writer head having writing gaps that provide servo bands with amplitude and time based features, wherein portions of the head in between the servo bands are removed for purposes of clarity.

FIG. 18, similarly shows a thin film servo writer head 960 comprising sub-pole members 964a and 964b, sub-gap member 966, and magnetically permeable layer 962 overlying members 964a, 964b, and 966. Thin film servo write head 960 includes a triple pattern wherein the zigzag patterns 969 are spaced before, within and after portions 969 of a vee-shaped identification pattern. Any variation of these patterns including such suggested positions are contemplated, whereas any of these patterns can be created by an appropriately designed thin film servo writer head having the pattern gap and as controlled by current pulsing. As above, such patterns with any combinations of zigzags and identification patterns can be laid down in periodic track and/or group identification sectors or as a continuous servo band. Only one gap pattern is shown on head 960, but in actual practice head 960 is likely to include multiple patterns in a plurality of channels. The gap pattern may also be used in a compound head such as head 900 of FIG. 15 in place of or in addition to pattern 918 of FIG. 15.

Figure 19:
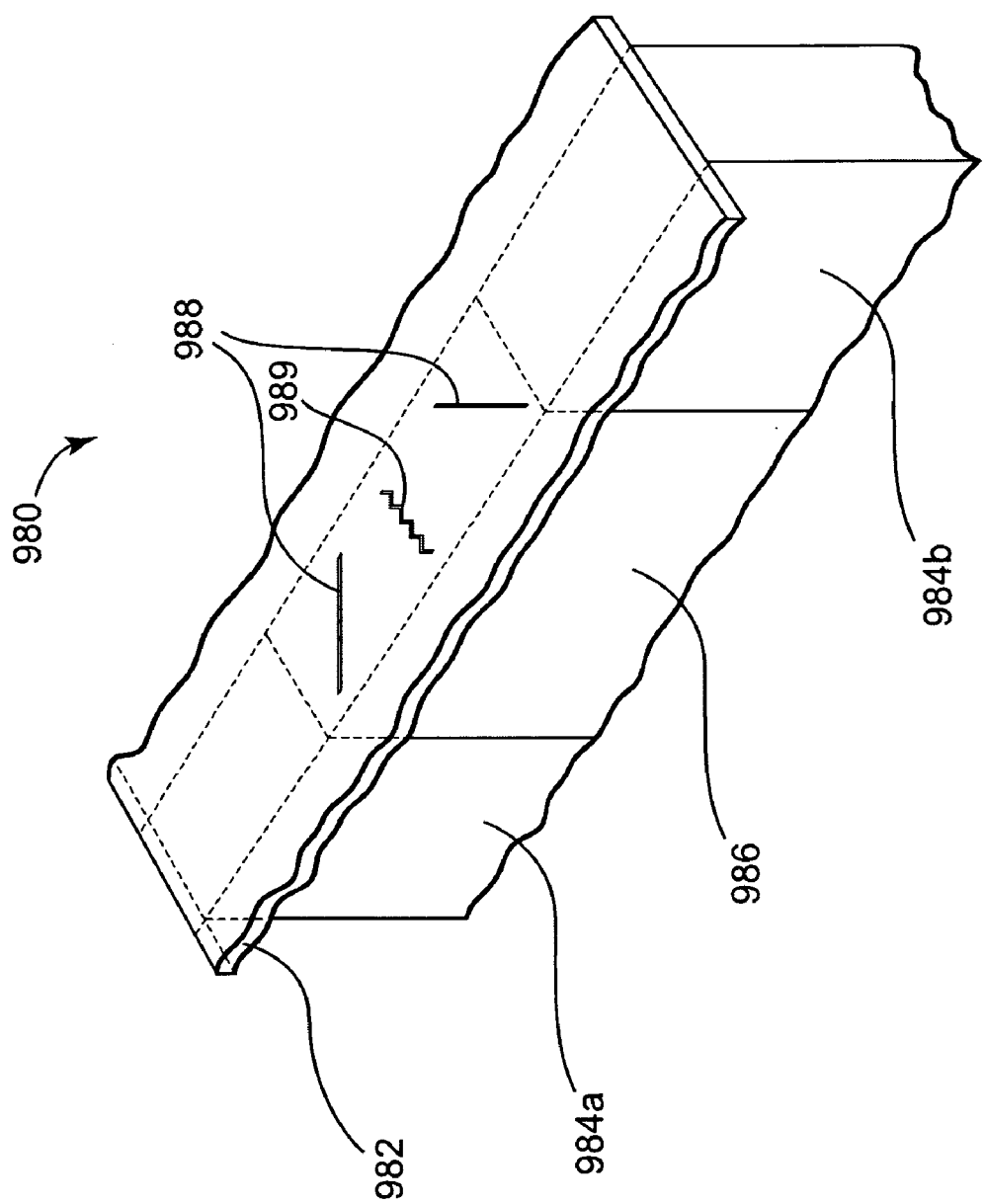
FIG. 19 shows a portion of an alternative embodiment of a servo writer head having relatively widely spaced writing gaps that provide servo bands with amplitude and time based features.

FIG. 19 schematically shows a portion of an alternative embodiment of a servo writer head 980 including sub-poles 984a and 984b and core member 986. Magnetically permeable layer 982 overlies these. Head 980 has a writing gap pattern including relatively widely spaced writing gaps 988 and 989. Gaps 988 include legs that form an inverted vee, while gap 989 is a zigzag with multiple azimuthal legs.

Figure 20:
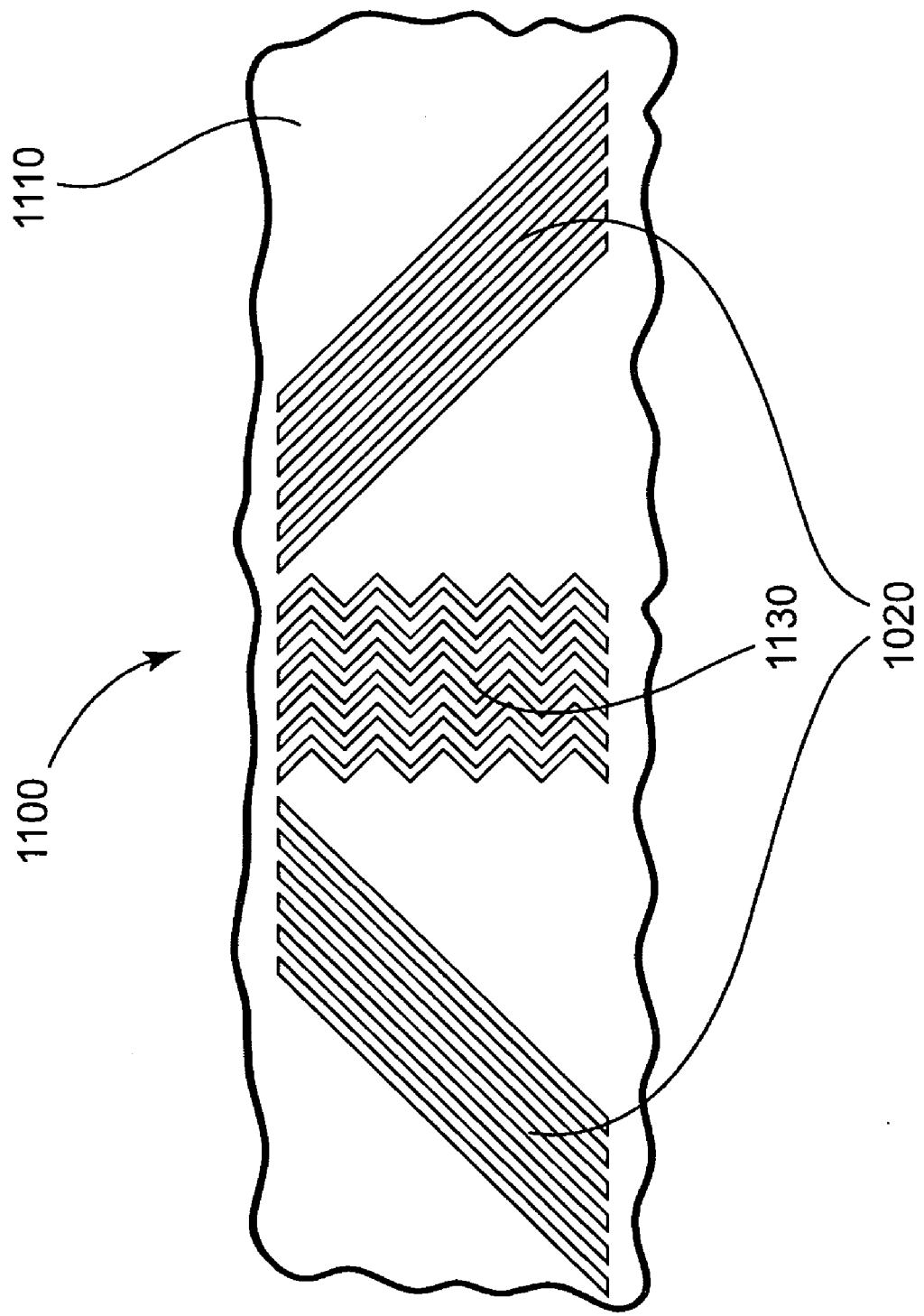
FIG. 20 shows a portion of a servo band comprising transition features formed by repeated pulsing of the servo writer head according to FIG. 19.

FIG. 20 shows a servo band 1100 including a servo transition pattern 1110 that may be written on a data storage medium by pulsing head 1000 at an appropriate frequency. With sufficient spacing among gaps 988 and 989 of FIG. 19, multiple inverted vee transitions 1020 and multiple zigzag transitions 1130 can be formed in servo band 1110. The resultant pattern is conveniently formed on a track/group ID sector of servo band 1100 that may if desired be used in combination with other kinds of servo sectors, such as track following servo sectors as described above. For purposes of illustration, six inverted vee transitions 1020 and six zigzag transitions 1130 are shown, although head 1000 (FIG. 19) may be pulsed one or more times as desired. One advantage of this multiple pulsed approach is that the servo signal obtained from transitions 1120 and 1130 can be averaged to obtain a higher signal to noise ratio than using only one vee transition

1020 and one zigzag transition 1130. Additionally, the multiple zigzag transitions further provide track following information.

The skilled worker will recognize that any servo write head embodiment of the invention may be used not just for writing but also for reading, e.g., to verify servo features. In some modes of practice, the same head may be used to both write and read, e.g., verify, servo features. Alternatively, one head may be used to write servo features, while a different head is used for verification. The head design may be adjusted to favor writing, reading, or both functions, primarily by adjusting characteristics of the coil(s) incorporated into the head. To favor writing, a coil with fewer turns and relatively large current carrying capacity may be used. For instance, a representative servo head favoring writing operations may include a coil formed with three to six coils that are able to carry about 100 milliamps to about 1 amp of current. On the other hand, to favor reading (e.g., verifying, a coil with more turns and lower current carrying capacity may be used to develop more voltage while carrying a smaller current. For instance, a representative servo head favoring reading (e.g., verifying) operations may include a coil formed with 20 or more turns, and often 50 or more turns, that carry less than 100 milliamps of current. To favor both reading and writing, a coil may include more turns and be sized to carry more current.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

All patents, patent documents, and publications cited herein are hereby incorporated by reference as if individually incorporated.

What is claimed is:

1. A method of recording servo information, comprising the step of writing servo information in a data storage medium using a compound servo writer head made by a method comprising the steps of:
    (a) providing a substrate comprising first and second magnetically permeable substrate portions, the first substrate portion comprising first and second sub-pole members, a first sub-gap member interposed between the first and second sub-pole members, and a first coil energizingly coupled to the first substrate portion, and the second substrate portion comprising third and fourth sub-pole members, a second sub-gap member interposed between the third and fourth sub-pole members, and a second coil energizingly coupled to the second substrate portion;
    (b) forming a magnetically permeable layer over the first and second magnetically permeable substrate portions of the substrate; and
    (c) using a single mask to lithographically pattern a first writing gap feature in a portion of the magnetically permeable layer overlying the first sub-gap member and a second writing gap feature in a portion of the magnetically permeable layer overlying the second sub-gap member.

2. The method of claim 1, wherein using the compound servo writer head comprises writing at least one servo band on a data storage medium, wherein the servo band comprises a plurality of azimuth style servo tracks.

3. The method of claim 2, wherein said azimuth style servo tracks are written in at least one track following sector and wherein the servo band further comprises a sector selected from the group consisting of a track ID sector, a data group ID sector, and a track and data group ID sector.

4. The method of claim 1, wherein said servo information comprises amplitude based servo features and time based servo features.

5. The method of claim 4 wherein said amplitude and time based servo features are written into different sectors of a servo band.

6. The method of claim 4, wherein said amplitude and time based servo features are written into the same sector of a servo band.

7. A method of recording servo information, comprising the step of writing servo information in a data storage medium using a compound magnetic recording head comprising:
    a substrate comprising first and second magnetically permeable substrate portions, and a substantially non-magnetic member interposed between the first and second magnetically permeable substrate portions; and
    a magnetically permeable layer over the first and second magnetically permeable substrate portions of the substrate, wherein the magnetically permeable layer comprises first and second writing gap features associated with the first and second substrate portions;
    wherein the writing gap features associated with the first and second substrate portions are formed using a patterned mask layer over the magnetically permeable layer, wherein the patterned mask layer comprises first and second patterned gap features corresponding to the first and second writing gap features.

8. The method of recording servo information of claim 7, wherein the patterned mask layer further comprises gap features corresponding to indicia from which the writing gap patterns can be accurately positioned.

9. The method of recording servo information of claim 7, wherein the magnetically permeable layer of the compound magnetic recording head is noncontiguous.

10. The method of recording servo information of claim 7, wherein the first writing gap feature comprises one or more gap patterns.

11. The method of recording servo information of claim 10, wherein the second writing gap feature comprises one or more gap patterns.

12. The method of recording servo information of claim 11, wherein at least one of the first or second writing gap features comprises a timing-based gap pattern.

13. The method of recording servo information of claim 12, wherein at least one of the first or second writing gap features comprises an amplitude-based gap pattern.

14. The method of recording servo information of claim 11, wherein the first and second writing gap features are aligned in the same servo channel.

\* \* \* \* \*

UNITED STATES PATENT AND TRADEMARK OFFICE
CERTIFICATE OF CORRECTION

PATENT NO. : 7,832,084 B2  
APPLICATION NO. : 11/510902  
DATED : November 16, 2010  
INVENTOR(S) : Matthew P. Dugas et al.

Page 1 of 1

It is certified that error appears in the above-identified patent and that said Letters Patent is hereby corrected as shown below:

SPECIFICATION

| Column | Line | PTO | Should Read |
|---|---|---|---|
| 13 | 43 | "angles θ and +may" | -- angles $\theta$ and $\varphi$ may -- |
| 28 | 6-7 | "photo lithographically" | -- photolithographically -- |

Signed and Sealed this
Twenty-second Day of February, 2011

David J. Kappos
*Director of the United States Patent and Trademark Office*